(12) United States Patent
Tsuchida

(10) Patent No.: US 11,682,037 B2
(45) Date of Patent: Jun. 20, 2023

(54) SIGNAGE CONTROL SYSTEM AND NON-TRANSITORY COMPUTER-READABLE RECORDING MEDIUM FOR RECORDING SIGNAGE CONTROL PROGRAM

(71) Applicant: AWL, Inc., Tokyo (JP)

(72) Inventor: Yasuhiro Tsuchida, Tokyo (JP)

(73) Assignee: AWL, Inc., Tokyo (JP)

( * ) Notice: Subject to any disclaimer, the term of this patent is extended or adjusted under 35 U.S.C. 154(b) by 244 days.

(21) Appl. No.: 17/245,485

(22) Filed: Apr. 30, 2021

(65) Prior Publication Data

US 2021/0343201 A1    Nov. 4, 2021

(30) Foreign Application Priority Data

May 1, 2020   (JP) .............................. JP2020-081542

(51) Int. Cl.
*G06Q 30/02*   (2023.01)
*G06Q 30/0242*   (2023.01)
(Continued)

(52) U.S. Cl.
CPC ..... *G06Q 30/0246* (2013.01); *G06Q 30/0269* (2013.01); *G06V 10/764* (2022.01); *G06V 20/53* (2022.01); *G06V 40/103* (2022.01); *G06V 40/161* (2022.01); *G06V 40/176* (2022.01); *G09F 19/00* (2013.01); *G09F 27/005* (2013.01);
(Continued)

(58) Field of Classification Search
CPC ........... G06Q 30/0246; G06Q 30/0269; G06V 40/161; G06V 40/176; G06V 40/103; G06V 10/764; G06V 20/53; G06V 40/178; G09F 19/00; G09F 27/005; G09F 2027/001
See application file for complete search history.

(56) References Cited

U.S. PATENT DOCUMENTS 5,710,590 A * 1/1998 Ichige .................... G06T 9/001
                                                     348/51
5,796,611 A * 8/1998 Ochiai .................... G01W 1/10
                                                     706/14
(Continued)

FOREIGN PATENT DOCUMENTS

JP        2010-160780 A        7/2010
WO   WO-2019094091 A1 *   5/2019   ........... G06F 1/1626
WO   WO-2021248432 A1 *  12/2021   ............. G06F 17/18

*Primary Examiner* — Michael I Ezewoko
(74) *Attorney, Agent, or Firm* — Obion, McClelland, Maier & Neustadt, L.L.P.

(57) ABSTRACT

A signage control system comprises: a primary estimation circuitry to use signage-side images and surveillance-side images to estimate a person feature, attributes and behavior of each person captured in these frame images; a storage device to associate and store results of estimations of the person feature, the attributes and the behavior of each specific person; an estimation result linkage circuitry to use the person feature stored in the storage device to link the results of estimations based on the frame images from multiple ones of the cameras for the same person so as to generate a group of estimation results for each person; and a content change circuitry to change a content displayed on the signage to another based on the attributes of each person expected to be in a position where such person can visually recognize the content on the signage, and based on preceding behavior of such person.

7 Claims, 11 Drawing Sheets

(51) Int. Cl.
*G09F 27/00* (2006.01)
*G06Q 30/0251* (2023.01)
*G09F 19/00* (2006.01)
*G06V 20/52* (2022.01)
*G06V 40/10* (2022.01)
*G06V 40/16* (2022.01)
*G06V 10/764* (2022.01)

(52) U.S. Cl.
CPC ...... *G06V 40/178* (2022.01); *G09F 2027/001* (2013.01)

(56) References Cited

U.S. PATENT DOCUMENTS

| | | | | |
|---|---|---|---|---|
| 6,640,145 B2* | 10/2003 | Hoffberg | G06F 18/00 | 709/200 |
| 7,006,881 B1* | 2/2006 | Hoffberg | G06V 40/103 | 709/200 |
| 7,374,405 B2* | 5/2008 | Wobben | B66C 1/108 | 416/244 R |
| 7,813,822 B1* | 10/2010 | Hoffberg | H04N 7/163 | 381/73.1 |
| 7,904,187 B2* | 3/2011 | Hoffberg | H04N 21/44224 | 370/200 |
| 7,921,036 B1* | 4/2011 | Sharma | G06Q 20/3674 | 705/52 |
| 7,966,078 B2* | 6/2011 | Hoffberg | G06F 3/048 | 370/200 |
| 8,107,527 B1* | 1/2012 | Hobbs | H04N 19/164 | 375/240.2 |
| 8,265,474 B2* | 9/2012 | Kanayama | H04N 23/675 | 348/333.12 |
| 8,271,887 B2* | 9/2012 | Offer | H04L 65/1094 | 709/204 |
| 8,336,049 B2* | 12/2012 | Medovich | G06Q 30/0202 | 718/1 |
| 8,345,768 B1* | 1/2013 | Hobbs | H04N 19/34 | 375/240.26 |
| 8,379,074 B2* | 2/2013 | Currivan | H04N 7/141 | 348/14.02 |
| 8,386,446 B1* | 2/2013 | Pasupathy | G06F 16/951 | 707/711 |
| 8,401,248 B1* | 3/2013 | Moon | G06V 40/18 | 382/103 |
| 8,467,133 B2* | 6/2013 | Miller | G06Q 30/02 | 359/13 |
| 8,516,266 B2* | 8/2013 | Hoffberg | G05B 15/02 | 715/239 |
| 8,583,263 B2* | 11/2013 | Hoffberg | H04N 5/913 | 700/83 |
| 9,097,891 B2* | 8/2015 | Border | G02B 27/0093 | |
| 9,182,596 B2* | 11/2015 | Border | G02B 27/0093 | |
| 9,223,134 B2* | 12/2015 | Miller | G06Q 30/02 | |
| 9,224,060 B1* | 12/2015 | Ramaswamy | G06V 40/161 | |
| 9,269,012 B2* | 2/2016 | Fotland | G06V 40/103 | |
| 9,298,974 B1* | 3/2016 | Kuo | G06V 40/167 | |
| 9,341,843 B2* | 5/2016 | Border | G06F 3/013 | |
| 9,652,031 B1* | 5/2017 | Savastinuk | G06F 3/0346 | |
| 9,684,826 B2* | 6/2017 | Dubuque | G06V 10/80 | |
| 9,729,865 B1* | 8/2017 | Kuo | G06F 1/1686 | |
| 9,842,253 B2* | 12/2017 | Dubuque | G06V 10/764 | |
| 9,979,739 B2* | 5/2018 | Mumcuoglu | H04L 63/1425 | |
| 9,979,742 B2* | 5/2018 | Mumcuoglu | H04L 63/1416 | |
| 10,027,883 B1* | 7/2018 | Kuo | H04N 23/63 | |
| 10,055,013 B2* | 8/2018 | Ramaswamy | G06F 3/04815 | |
| 10,075,461 B2* | 9/2018 | Mumcuoglu | H04L 63/1441 | |
| 10,096,125 B1* | 10/2018 | Yang | G06T 7/246 | |
| 10,146,301 B1* | 12/2018 | Jassal | G06F 3/017 | |
| 10,356,106 B2* | 7/2019 | Engel | H04L 63/1408 | |
| 10,386,919 B2* | 8/2019 | Jassal | G06F 3/04845 | |
| 10,475,207 B2* | 11/2019 | Yang | G06F 18/211 | |
| 10,484,530 B2* | 11/2019 | Wantland | G06F 1/3265 | |
| 10,645,110 B2* | 5/2020 | Mumcuoglu | G06F 21/566 | |
| 10,699,114 B2* | 6/2020 | Dubuque | G06V 10/87 | |
| 10,719,744 B2* | 7/2020 | Smith | G06F 18/211 | |
| 10,742,399 B2* | 8/2020 | Chen | G06N 5/022 | |
| 10,778,412 B2* | 9/2020 | Chen | G06T 7/11 | |
| 10,797,863 B2* | 10/2020 | Chen | G06N 3/04 | |
| 10,818,014 B2* | 10/2020 | Xu | G06T 7/11 | |
| 10,915,167 B2* | 2/2021 | Jassal | G06F 3/0482 | |
| 11,023,769 B2* | 6/2021 | Qian | G06V 10/82 | |
| 11,109,105 B2* | 8/2021 | Ventura | G06Q 30/0259 | |
| 11,139,958 B2* | 10/2021 | Smith | G06F 18/213 | |
| 11,145,201 B2* | 10/2021 | Yang | G06Q 50/26 | |
| 11,188,947 B2* | 11/2021 | Walden | H04B 17/318 | |
| 11,290,708 B2* | 3/2022 | Haskin | H04N 5/265 | |
| 11,301,676 B2* | 4/2022 | Dubuque | G06Q 30/0207 | |
| 11,379,987 B2* | 7/2022 | Xu | G06T 7/73 | |
| 11,450,123 B2* | 9/2022 | Strong | G06F 21/53 | |
| 11,462,036 B2* | 10/2022 | Smith | G06T 7/11 | |
| 11,481,583 B2* | 10/2022 | Smith | H04L 9/3239 | |
| 11,481,805 B2* | 10/2022 | Glaser | G06Q 30/0255 | |
| 11,481,809 B2* | 10/2022 | Hutton | G06T 17/20 | |
| 11,521,024 B2* | 12/2022 | Chen | H04L 67/51 | |
| 11,531,850 B2* | 12/2022 | Chen | G06F 9/5066 | |
| 11,562,181 B2* | 1/2023 | Chen | G06F 16/538 | |
| 11,563,932 B2* | 1/2023 | Haskin | H04N 5/265 | |
| 2008/0232687 A1* | 9/2008 | Petersohn | G06V 20/40 | 382/173 |
| 2011/0221896 A1* | 9/2011 | Haddick | H04N 23/635 | 348/143 |
| 2012/0075168 A1* | 3/2012 | Osterhout | G06F 3/017 | 345/8 |
| 2012/0206335 A1* | 8/2012 | Osterhout | G06F 1/163 | 345/156 |
| 2012/0212398 A1* | 8/2012 | Border | G06Q 30/02 | 345/8 |
| 2012/0212484 A1* | 8/2012 | Haddick | G06Q 30/02 | 345/419 |
| 2012/0212499 A1* | 8/2012 | Haddick | G02B 27/0093 | 345/589 |
| 2012/0218301 A1* | 8/2012 | Miller | G06Q 30/02 | 345/633 |
| 2012/0235886 A1* | 9/2012 | Border | G06F 3/013 | 345/8 |
| 2012/0242697 A1* | 9/2012 | Border | G02B 27/017 | 345/633 |
| 2012/0242698 A1* | 9/2012 | Haddick | G06Q 30/02 | 345/633 |
| 2012/0315839 A1* | 12/2012 | Mumcuoglu | H04W 4/02 | 455/2.01 |
| 2013/0127980 A1* | 5/2013 | Haddick | G06F 3/013 | 348/14.08 |
| 2013/0201316 A1* | 8/2013 | Binder | H04L 67/12 | 701/2 |
| 2013/0278631 A1* | 10/2013 | Border | G06Q 30/02 | 345/633 |
| 2016/0086029 A1* | 3/2016 | Dubuque | G06V 10/95 | 382/159 |
| 2017/0054744 A1* | 2/2017 | Mumcuoglu | H04L 63/1425 | |
| 2017/0249508 A1* | 8/2017 | Dubuque | H04W 4/02 | |
| 2018/0068184 A1* | 3/2018 | Dubuque | G06V 10/95 | |
| 2018/0293738 A1* | 10/2018 | Yang | G06F 18/211 | |
| 2018/0321738 A1* | 11/2018 | Jassal | G06Q 30/0261 | |
| 2018/0357789 A1* | 12/2018 | Yang | G06T 7/73 | |
| 2019/0042867 A1* | 2/2019 | Chen | G06V 10/82 | |
| 2019/0042870 A1* | 2/2019 | Chen | G06V 20/00 | |
| 2019/0043201 A1* | 2/2019 | Strong | G06V 10/771 | |
| 2019/0044703 A1* | 2/2019 | Smith | H04N 19/80 | |
| 2019/0045207 A1* | 2/2019 | Chen | G06F 9/5072 | |
| 2019/0141181 A1* | 5/2019 | Wantland | G06F 1/3287 | |
| 2019/0294238 A1* | 9/2019 | Jassal | G06F 3/04845 | |
| 2020/0250003 A1* | 8/2020 | Yang | G06N 3/08 | |
| 2020/0279109 A1* | 9/2020 | Dubuque | G06V 10/955 | |
| 2021/0174155 A1* | 6/2021 | Smith | G06F 18/211 | |
| 2021/0194674 A1* | 6/2021 | Chen | G06K 15/1886 | |
| 2021/0243012 A1* | 8/2021 | Chen | G06V 20/00 | |
| 2021/0266145 A1* | 8/2021 | Chen | G06N 3/063 | |
| 2021/0314674 A1* | 10/2021 | Sodagar | H04L 65/75 | |
| 2022/0180651 A1* | 6/2022 | Strong | G06F 18/24 | |

(56) References Cited

U.S. PATENT DOCUMENTS

* cited by examiner

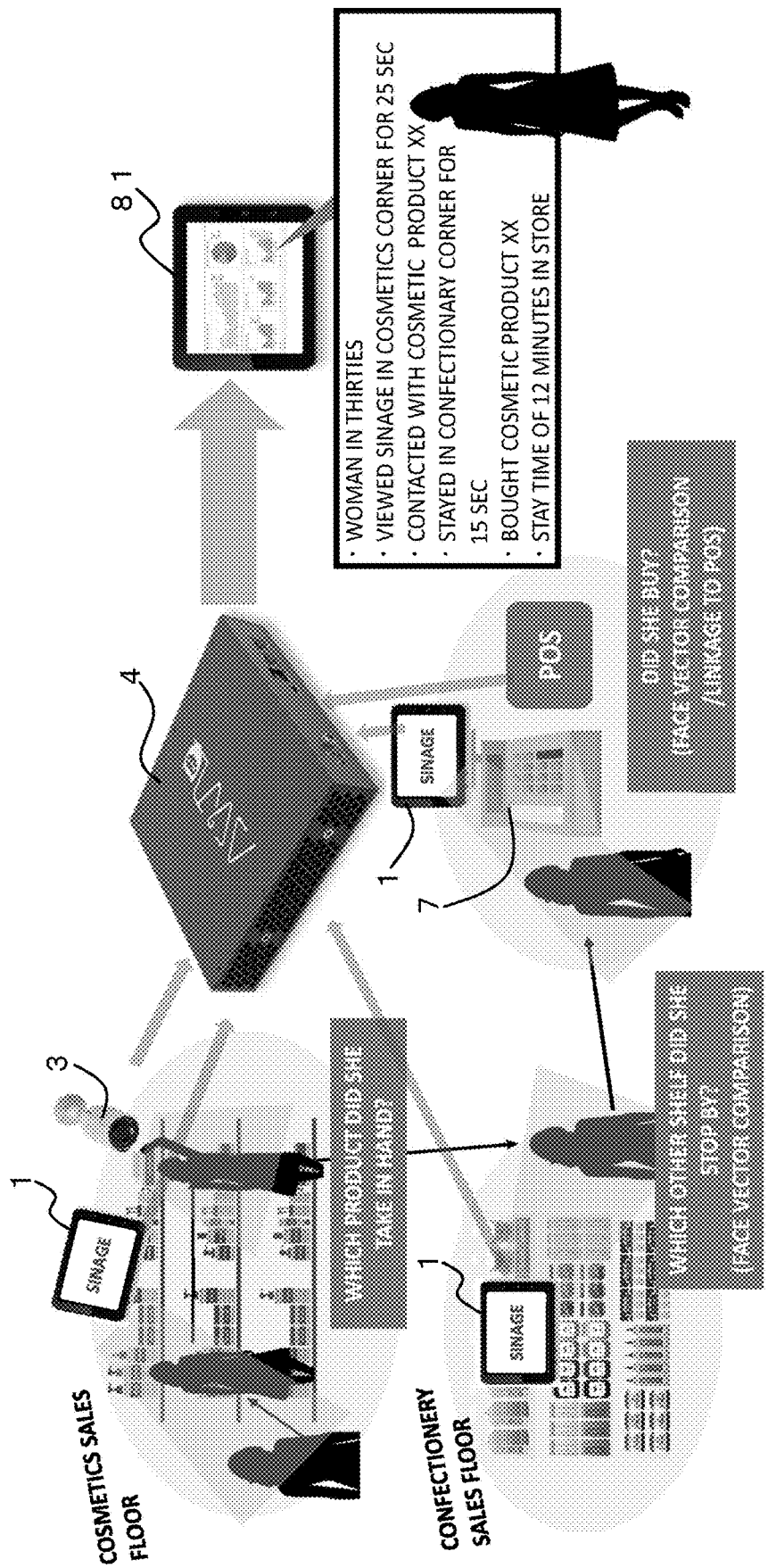

SIGNAGE CONTROL SYSTEM AND NON-TRANSITORY COMPUTER-READABLE RECORDING MEDIUM FOR RECORDING SIGNAGE CONTROL PROGRAM

CROSS-REFERENCE TO RELATED APPLICATION

This application is based on and claims the benefit of priority of the prior Japanese Patent Application No. 2020-081542, filed on May 1, 2020, the entire contents of which are incorporated herein by reference.

BACKGROUND OF THE INVENTION

1. Field of the Invention

The present invention relates to a signage control system and a non-transitory computer-readable recording medium for recording a signage control program.

2. Description of the Related Art

Conventionally, there is a video display system called digital signage which is placed in a commercial facility such as store, station, and so on. This digital signage is mainly used as an advertising medium, and can easily change advertisements. The effectiveness of a digital signage when placed in a store can be evaluated based on whether "an advertisement could attract the attention of a customer" or whether "the result of displaying an advertisement on the digital signage led to a specific buying behavior".

The point of whether "an advertisement could attract the attention of a customer" described above can be analyzed by capturing images of a customer using a camera mounted on a terminal for the digital signage (hereafter referred to simply as "signage") when an advertising content is displayed on the signage, and by using the captured images of the customer to obtain information of the customer (line of sight, direction of face, time staring at the signage, and attribute information such as gender and age of the customer) when the content is displayed. In recent years, a system of tablet-type signage using a tablet terminal is known, which is designed to display an advertising content on (the display of) the signage, and to analyze the attributes and behavior of a customer viewing the content, and further to change the content displayed on the signage to another depending on the result of the analysis (attributes and behavior of the customer).

Japanese Laid-open Patent Publication 2020-160780 discloses an example of such a system (hereafter referred to as "signage control system") as described above, which is designed to change a content displayed on a signage to another depending on the attributes and behavior of a customer viewing the content. The system (signage control system) of this Japanese Patent Publication estimates the attributes of the customer, who is viewing the content displayed on the signage, based on images of the customer captured by a camera mounted on the signage, and then, depending on the estimated attributes, the system changes the content displayed on the signage to another.

However, conventional signage control systems have the following problems. The conventional signage control systems including the system disclosed in the above Japanese Patent Publication 2020-160780 are designed so that the attributes and behavior of a customer viewing an advertising content displayed on the signage are analyzed based only on the images of such customer captured by a camera mounted on the signage, and the content displayed on the signage is changed to another depending on the result of this analysis. Thus, the conventional signage control systems can analyze the behavior of a customer occurring in front of the (camera of the) signage, and can change the content displayed on the signage to another based on the behavior of the customer, but cannot change the content displayed on the signage to another considering the behavior of the customer before the customer comes in front of the signage. Further, the method, such as the conventional signage control systems, which analyzes the attributes and behavior of a customer based only on images of the customer captured by a camera mounted on the signage, cannot start analyzing the attributes and behavior of the customer before the customer comes in front of the signage. Therefore, it was not possible to immediately display a content to attract the interest of the customer on the signage when the customer comes in front of the signage (and into a place or position in an area where a person can visually recognize details of the content displayed on the signage).

BRIEF SUMMARY OF THE INVENTION

An object of the present invention is to solve the problems described above, and to provide a signage control system and a non-transitory computer-readable recording medium for recording a signage control program that make it possible to change a content displayed on a signage to another considering the behavior of a person such as a customer before the person such as the customer comes in front of the signage, and also makes it possible to immediately display a content to attract the interest of the person such as consumer on the signage when the person such as the customer comes into a position where the person such as the customer can visually recognize (details of) the content displayed on the signage.

According to a first aspect of the present invention, this object is achieved by a signage control system comprising a signage, a signage-side camera to capture images in front of the signage and at least one surveillance camera to capture a given capture area, wherein the signage control system further comprises: a primary estimation circuitry configured to use signage-side images which are frame images from the signage-side camera and surveillance-side images which are frame images from the at least one surveillance camera so as to estimate a person feature of each person in these frame images, and also estimate attributes and behavior of the each person captured in these frame images; a storage device configured to associate and store results of estimations of the person feature, the attributes and the behavior of each specific person as estimated by the primary estimation circuitry using the frame images from each specific one of the signage-side cameras and the at least one surveillance camera; an estimation result linkage circuitry configured to use the person feature stored in the storage device to link the results of estimations based on the frame images from multiple ones of the cameras for the same person so as to generate a group of estimation results for each person; and a content change circuitry configured to change a content displayed on the signage to another based on the attributes of each person who is expected to be in a position where such person can visually recognize the content on the signage, and also based on preceding behavior of such person before then, the attributes and the preceding behavior being contained in the group of estimation results generated by the estimation result linkage circuitry.

According to this signage control system, a content displayed on a signage is changed to another based on the attributes of each person who is expected to be in a position where such person can visually recognize the content on the signage, and also based on preceding behavior of such person before then, all of which are contained in the group of estimation results generated by linking the estimation results based on the frame images from multiple ones of the cameras (signage-side camera and at one surveillance camera) for the same customer. Thus, the content displayed on the signage can be changed to another, considering not only the attributes of each person expected to be in a position where such person can visually recognize the content on the signage, but also the preceding behavior of such person before such person has come in front of the signage (to a position where such person can visually recognize the content on the signage). Therefore, as compared with the conventional signage control system disclosed in Japanese Laid-open Patent Publication 2020-160780, which changes a content on a signage to another based only on the attributes and behavior of each person analyzed based on the frame images of such person captured by a signage-side camera, it is possible to display a content which better matches such person in front of the signage (in a position where such person can visually recognize the content on the signage).

Further, in contrast to the conventional signage control system disclosed in Japanese Laid-open Patent Publication 2020-160780, which estimates the attributes and behavior of each person from only the frame images (signage-side images) of such person or other person captured by a signage-side camera, the signage control system of the first aspect of the present invention is designed to use not only the signage-side images but also frame images (surveillance camera-side images) of each person captured by at least one surveillance camera to estimate the person feature, attributes and behavior of such person captured in these frame images. Thus, in contrast to the conventional signage control system disclosed in Japanese Laid-open Patent Publication 2020-160780, the process of estimating the attributes, behavior and the like of each person who is expected to be in a position where such person can visually recognize the content on the signage can be started by using the surveillance camera-side images having been captured prior to the signage-side images, before such person comes into the position where such person can visually recognize the content on the signage. Therefore, it is possible to immediately display a content to attract the interest of such person when such person comes into the position where such person can visually recognize the content on the signage.

According to a second aspect of the present invention, the above object is achieved by a non-transitory computer-readable recording medium for recording a signage control program to cause a computer to execute a process including the steps of: using signage-side images which are frame images from the signage-side camera and surveillance-side images which are frame images from the at least one surveillance camera so as to estimate a person feature of each person in these frame images, and also estimate attributes and behavior of the each person captured in these frame images; associating and storing results of estimations of the person feature, the attributes and the behavior of each specific person using the frame images from each specific one of the signage-side cameras and the at least one surveillance camera; using the person feature stored in the storage device to link the results of estimations based on the frame images from multiple ones of the cameras for the same person so as to generate a group of estimation results for each person; and changing a content displayed on the signage to another based on the attributes of each person who is expected to be in a position where such person can visually recognize the content on the signage, and also based on preceding behavior of such person before then, the attributes and the preceding behavior being contained in the group of estimation results.

By using a signage control program recorded in the non-transitory computer-readable recording medium, it is possible to obtain an effect similar to that by the signage control system according to the first aspect of the present invention.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that the drawings are shown for the purpose of illustrating the technical concepts of the present invention or embodiments thereof, wherein:

FIG. 11 is an explanatory view showing a customer behavior tracking process and an advanced video analysis achieved by the signage control system.

DETAILED DESCRIPTION OF THE INVENTION

Figure 1:
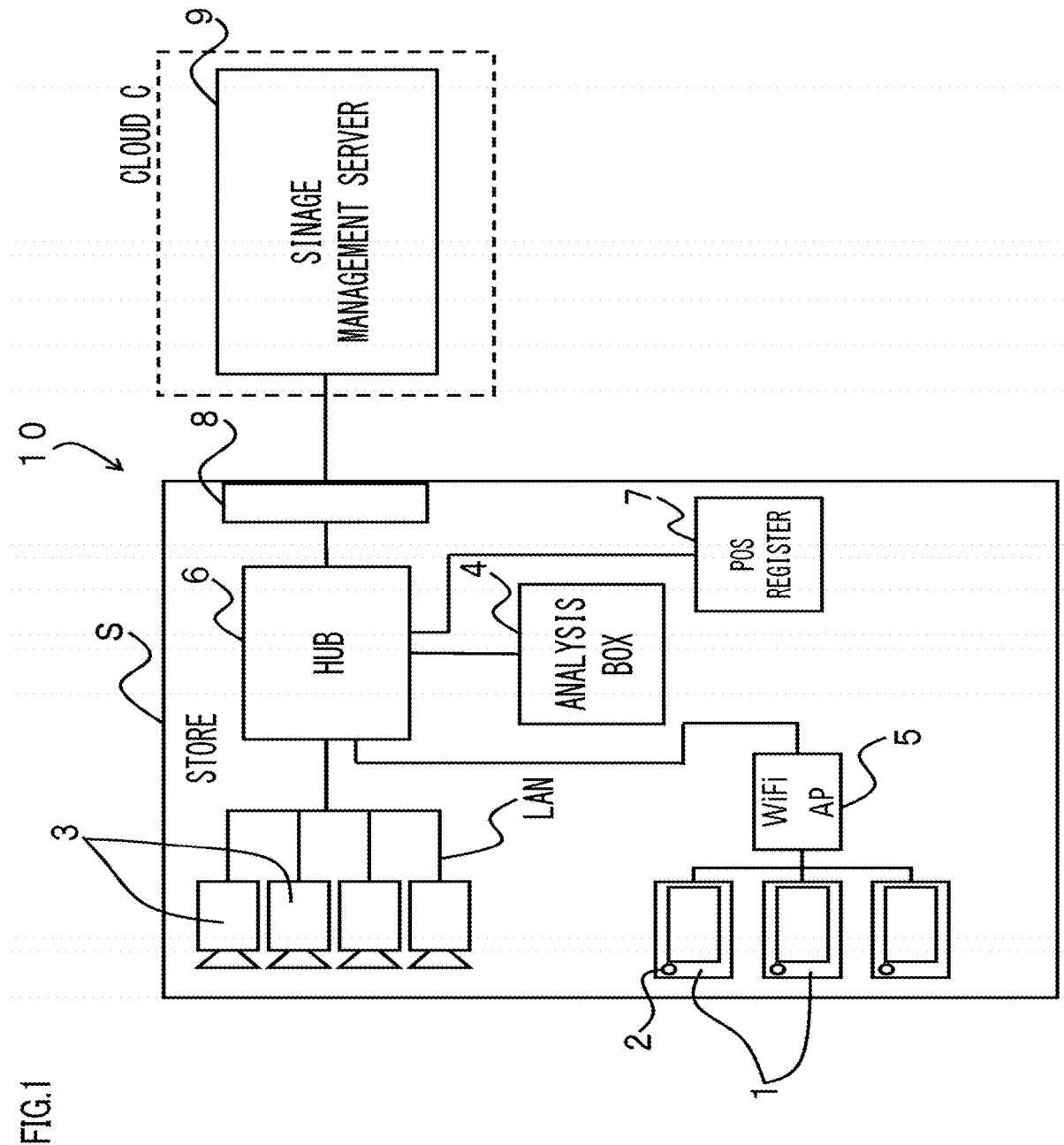
FIG. 1 is a schematic block diagram showing an outline configuration of a signage control system according to an exemplary embodiment of the present invention.

Hereinafter, a signage control system and a signage control program according to an exemplary embodiment of the present invention will be described with reference to the drawings. FIG. 1 is a schematic block diagram showing an outline configuration of a signage control system 10 according to the exemplary embodiment of the present invention. The present embodiment describes an example in which a plurality of signages 1 as tablet terminals for digital signage, a plurality of fixed cameras (surveillance cameras) 3 as network cameras (Internet Protocol or IP cameras) for surveillance to capture a given capture area, and an analysis box 4 connected to these signages 1 and fixed cameras 3 are placed in a store S such as a chain store.

As shown in FIG. 1, the signage control system 10 comprises a WiFi AP (WiFi Access Point) 5, a hub 6, a POS (Point Of Sales) register 7 as a POS system terminal, and a router 8 in addition to the signages 1, the fixed cameras 3 and the analysis box 4 in the store S. Each of the signages 1 is mainly placed on a product shelf in the store S, and comprises a touch panel display 14 (refer to FIG. 2) on which to display advertising contents, for example, for a customer (corresponding to the "person" in the claims) entering the store S. The signage 1 further comprises a built-in camera 2 (corresponding to "signage-side camera" in the claims) to capture images in front of the signage 1, and uses signage-side images, which are frame images from the built-in camera 2, to perform a recognition process including estimating the attributes (gender and age or generation) and extracting a face vector of a customer captured in the signage-side images.

The analysis box 4 is connected to each of the signages 1 via the WiFi AP 5 and the hub 6, and also connected to each of the plurality of fixed cameras 3 via a LAN (Local Area Network) and the hub 6 to analyze input images from each of these fixed cameras 3. More specifically, the analysis box 4 subjects input fixed camera-side images (corresponding to the "surveillance camera-side images" in the claims) which are frame images from each of the fixed cameras 3 to an object detection process (including face detection process), and also subjects face images of a customer detected by the object detection process to an inference process (including an attribute estimation process such as gender and age or generation, a face vector extraction process, a behavior estimation process, and a person re-identification process to re-identify the customer which will be referred to as "ReID process"). Further, based on the result of attribute estimation, the face vector and so on sent from the signages 1, the analysis box 4 performs an inference process including the above ReID process and the customer behavior estimation process. The combination of the analysis box 4 and the signages 1 corresponds to the "computer" in the claims.

Further, the signage control system 10 comprises a signage management server 9 on cloud C. The signage management server 9 is a server placed in a management department (head office or the like) of each store including the store S. A manager of each store, an advertiser of an advertisement (advertising content) displayed on each signage 1 and other person not only can access the signage management server 9 on cloud C from its own personal computer to know the gender and age of a viewer of the advertising content displayed on the signage 1, and an viewer rating of the advertisement (advertising content), but also can know a tracking result of the behavior of the customer including whether or not the customer has contacted with the advertised product after viewing the advertisement, and whether or not the customer has bought the product it has contacted with. Further, the signage control system 10 comprises a not shown server of the POS system (POS server) on cloud C.

Figure 2:
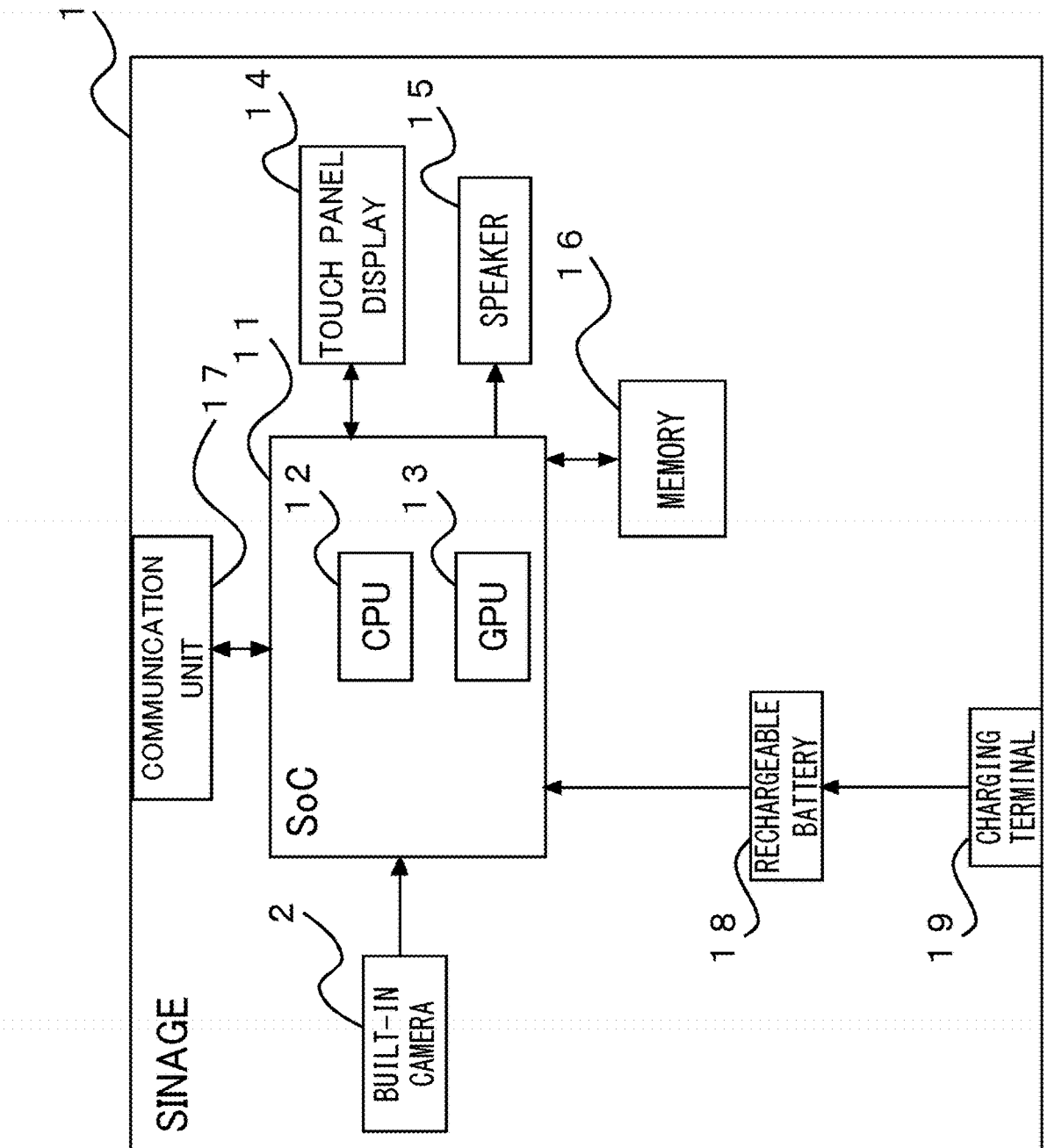
FIG. 2 is a schematic block diagram showing an outline hardware configuration of a signage in FIG. 1.

Next, referring to FIG. 2, the hardware configuration of the above-described tablet type signage 1 will be described. The signage 1 comprises, in addition to the built-in camera 2, a SoC (System-on-a-Chip) 11, a touch panel display 14, a speaker 15, a memory 16 for storing various data and programs, a communication unit 17, a rechargeable battery 18, and a charging terminal 19. The SoC 11 comprises a CPU (Central Processing Unit) 12 configured to control the entire device and perform various operations, and a GPU 13 used for, for example, inference processes in various learned DNN (Deep Neural Networks) models.

The programs stored in the memory 16 include a signage-side control program 50 including various inference models included in an AI (Artificial Intelligence) model group 51 described later in FIG. 5. The communication unit 17 comprises a communication IC (Integrated Circuit) and an antenna. The signage 1 is connected to the analysis box 4 and the signage management server 9 on cloud C via the communication unit 17 and a network. The rechargeable battery 18 is a battery such as lithium-ion battery which can be used repeatedly by charging, and stores power from a commercial power supply after converting it to DC power by an AC/DC converter, and further supplies it to respective parts of the signage 1.

Figure 3:
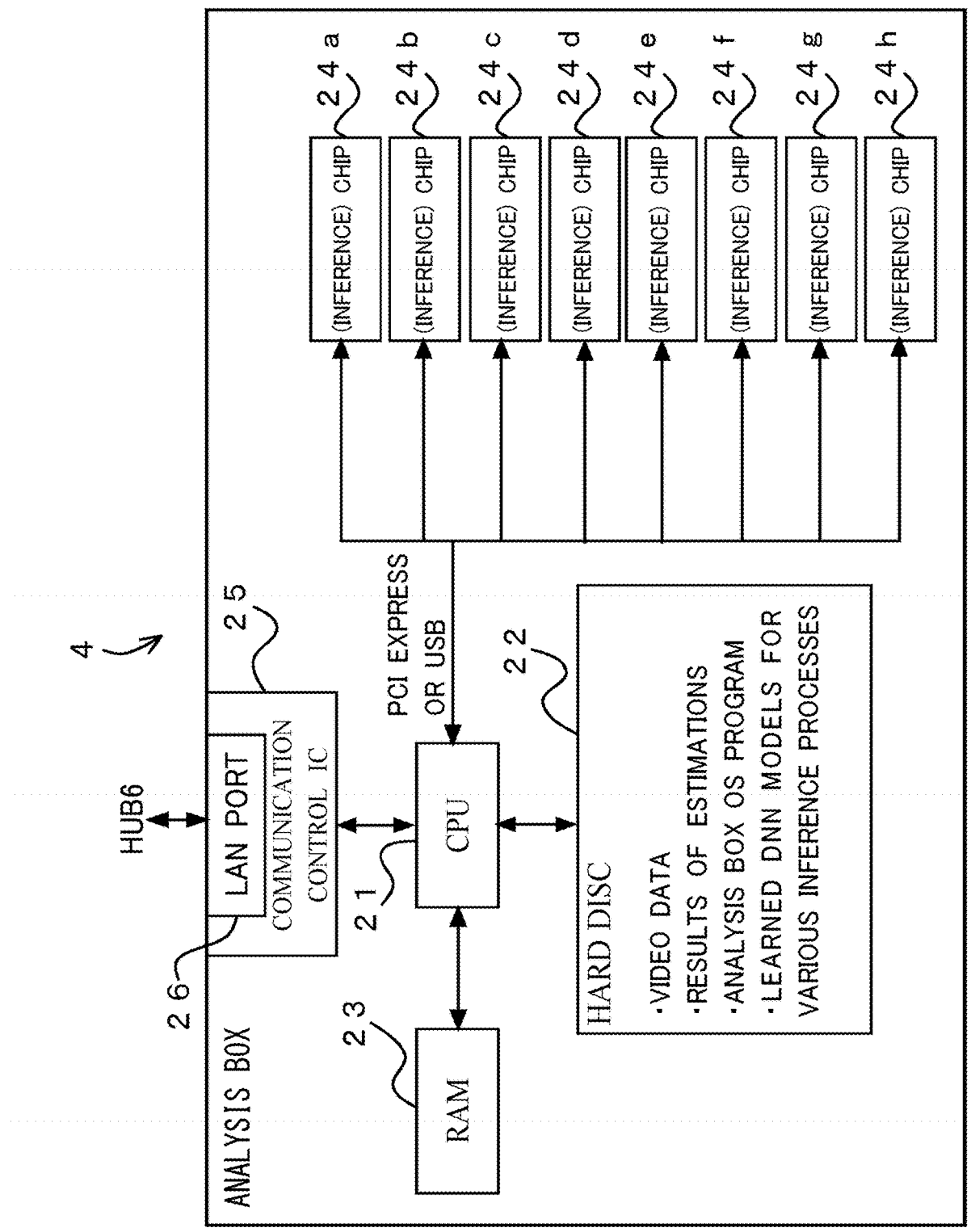
FIG. 3 is a schematic block diagram showing an outline hardware configuration of an analysis box in FIG. 1.

Next, referring to FIG. 3, the hardware configuration of the analysis box 4 will be described. The analysis box 4 comprises: a CPU 21 configured to control the entire device and perform various operations; a hard disk 22 for recording or storing various data and programs; a RAM (Random Access Memory) 23; inference chips (hereafter referred to simply as "chips") 24a to 24h as DNN (Deep Neural Networks) inference processors; and a communication control IC 25. The CPU 21 is a common general-purpose CPU or a CPU designed to increase parallel processing performance to process a lot of video streams at the same time. Further, the data recorded or stored in the hard disk 12 include video data (fixed camera-side images) obtained by decoding (data of) video streams input from each of the fixed cameras 3, and also include results of estimations using a primary estimation circuitry 32 of the analysis box 4 and a primary estimation circuitry 41 of the signage 1 which are described later. Further, the programs recorded or stored in the hard disk 22 include an analysis box OS (Operating system) program, and learned DNN inference models (learned DNN models for various inference processes) for such as face detection process, attribute (gender and age or generation) estimation (face recognition) process, face vector extraction process, behavior estimation process, ReID process, and later-described arrival time estimation process. The above-described learned DNN models for various inference processes together with the signage-side control program 50 described later in FIG. 5 form a "signage control program" in the claims. The combination of the hard disk 22 and the memory 16 of the signage 1 described above corresponds to the "non-transitory computer-readable recording medium" in the claims.

The (inference) chips 24a to 24h are preferably processors optimized for DNN inference (chips dedicated for the inference), but can be general-purpose GPUs (Graphics Processing Units) used for common use, or other processors. Further, the chips 24a to 24h can be devices made by integrating (mounting) a plurality of chips (inference processors) on one board computer. It is also possible to mount multiple kinds of chips on one analysis box 4. As shown in FIG. 3, the (inference) chips 24a to 24h are connected to the CPU 21 by PCI (Peripheral Component Interconnect) Express or USB (Universal Serial Bus). Note that it is possible to connect a part of the chips 24a to 24h to the CPU 21 by PCI Express, and connect the other chips to the CPU 21 by USB. Further, the communication control IC 25 has a LAN port 26 which is a port for connection to LAN based on the Ethernet Standard.

Figure 4:
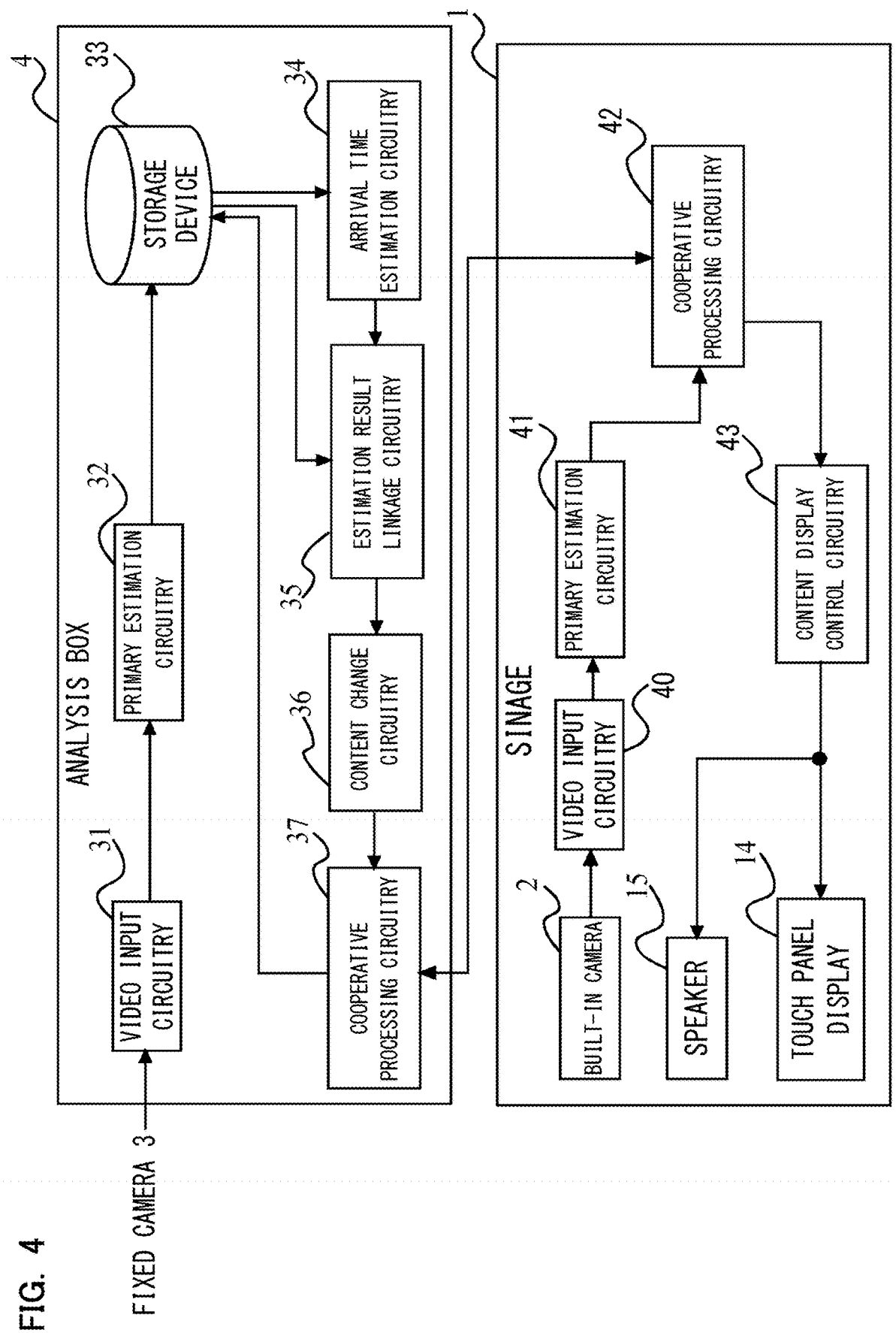
FIG. 4 is a schematic block diagram showing a functional block diagram of the signage and the analysis box.

FIG. 4 shows functional blocks of the signage 1 and the analysis box 4 described above. As the functional blocks, the analysis box 4 comprises a video input circuitry 31, a primary estimation circuitry 32, a storage device 33 (corresponding to the hard disk 22 in FIG. 3), an arrival time estimation circuitry 34, an estimation result linkage circuitry 35, a content change circuitry 36 and a cooperative processing circuitry 37. The video input circuitry 31 is formed by the communication control IC 25 and the CPU 21 in FIG. 3, and is configured to receive and decode (data of) video streams input from each of the fixed cameras 3 into data of frame images (fixed camera-side images). The primary estimation circuitry 32 is configured to use the fixed camera-side images to infer (estimate): a face vector (corresponding to the "person feature" in the claims) to identify each customer in the fixed camera-side images; attributes (gender and age or generation) of each customer captured in the fixed camera-side images; and behavior of each customer captured in the fixed camera-side images. The behavior of each customer at least includes contact of such customer with a product (that the customer takes the product in hand). The behavior of each customer described above may include behavior such that such customer is walking, such customer is looking at the signage 1 placed on a product shelf, and so on.

The storage device 33 is configured to associate and store the results of estimations of the face vector, the attributes and the behavior of each specific customer as estimated by the primary estimation circuitry 32 using the frame images from each specific one of the fixed cameras 3. The storage device 33 is also configured to associate and store the face vector and the results of estimations of the attributes and behavior of each specific customer as estimated by a signage 1-side primary estimation circuitry 41 described later using frame images (signage-side images) from a built-in camera 2 of such signage 1. Here, the face vector, the attributes and the behavior stored in the storage device 33 described above are those respectively obtained by the inference (estimation) performed by the primary estimation circuitry 32 for each specific customer during the time from frame-in to frame-out of such specific customer in the images captured by the specific camera (fixed camera 3 or built-in camera 2), more specifically, from when the capture of such specific customer in the images starts to when the capture of such specific customer in the images ends.

The arrival time estimation circuitry 34 is configured to estimate arrival time of each customer captured in the frame images captured by the fixed camera 3 at which such customer is expected to arrive at a position where such customer can visually recognize a content displayed on each signage 1. More precisely, the arrival time estimation circuitry 34 is configured so that, from a motion vector of such customer captured in the fixed camera-side images and from the time point at which such customer appears in the fixed camera-side images, the arrival time estimation circuitry 34 estimates the arrival time of such customer at which such customer is expected to arrive at the position where such customer can visually recognize the content displayed on such signage 1.

Based on the face vector of each customer stored in the storage device 33, the estimation result linkage circuit 35 links the results of estimations (results of estimations of the face vector, the attributes and the behavior) based on the frame images from multiple ones of the cameras (built-in cameras 2 of the plurality of signages 1 and the plurality of fixed cameras 3) for the same customer so as to generate a group of estimation results for each customer. More precisely, the estimation result linkage circuitry 35 is configured so that, based on the face vector stored in the storage device 33 for each customer who is expected to arrive at a position where such customer can visually recognize a content on each signage 1 as a result of the estimation using the arrival time estimation circuitry 34, the estimation result linkage circuitry 35 links the estimation results based on the frame images from multiple ones of the cameras (built-in cameras 2 of the signages 1 and fixed cameras 3) for the same customer so as to generate a group of estimation results for each customer. The estimation result linkage process using the estimation result linkage circuitry 35 is performed using a DNN model for the re-identification process for each customer (customer ReID process based on the face vector of each customer) included in the learned DNN models for various inference processes stored in the hard disk 22.

The group of estimation results generated using the estimation result linkage circuitry 35 includes the attributes of a customer who is expected to be in a position where such customer can visually recognize a content displayed on the signage 1, and also includes the (preceding) behavior of such customer before then. Based on such attributes and such preceding behavior of the customer, the content change circuitry 36 changes the content displayed on (the touch panel display 14 of) the signage 1 to another. The cooperative processing circuitry 37 is configured to perform a process to receive, from the signage 1, various estimation results (face vector, attributes and behavior of the customer), a tracking ID described later, and so on, and store them in the storage device 33, and also perform a process to send, to the signage 1, identification information such as URL (Uniform Resource Locator) of a content to be displayed which is output from the content change circuitry 36. Among the functional blocks of the analysis box 4 described above, the primary estimation circuitry 32, the arrival time estimation circuitry 34 and the estimation result linkage circuitry 35 are formed by the CPU 21 and the (inference) chips 24*a* to 24*h* (refer to FIG. 3). Further, the storage device 33 is formed by the hard disk 22 in FIG. 3, and the content change circuitry 36 is formed by the CPU 21, while the cooperative processing circuitry 37 is formed by the communication control IC 25 and the CPU 21 in FIG. 3.

As the functional blocks, the signage 1 comprises a video input circuitry 40, a primary estimation circuitry 41, a cooperative processing circuitry 42 and a content display control circuitry 43 in addition to the built-in camera 2, the touch panel display 14 and the speaker 15 described above. The video input circuitry 40 is mainly formed by the SoC 11 in FIG. 2 (including a not shown I/O or Input/Output chip set), and receives and decodes (data of) the video streams input from the built-in camera 2 of each signage 1 into frame image data (signage-side images). The primary estimation circuitry 41 is configured to perform, based on the signage-side images described above, a process similar to that of the primary estimation circuitry 32 in the analysis box 4. More specifically, based on the signage-side images, the primary estimation circuitry 41 infers (estimates) a face vector (corresponding to the "person feature" in the claims) for identifying a customer in the signage-side images, and also infers (estimates) the attributes (gender and age or generation) and behavior of the customer captured in the signage-side images.

The cooperative processing circuitry 42 is configured to perform a process to send the estimation results obtained by using the primary estimation circuitry 41 to the analysis box 4, and a process to receive identification information of the content to be displayed which is output from the content change circuitry 36, and output the received identification information to the content display control circuitry 43. The content display control circuitry 43 is configured to control to output an image and a sound of a content corresponding to the identification information (such as URL) of the content output from the cooperative processing circuitry 42 to the touch panel display 14 and the speaker 15, respectively. The video input circuitry 40, the primary estimation circuitry 41 and the content display control circuitry 43 among the functional blocks of the signage 1 described above are formed by the SoC 11 in FIG. 2, while the cooperative processing circuitry 42 is formed by the communication unit 17 and (mainly the CPU 12) of the SoC 11 in FIG. 2.

Figure 5:
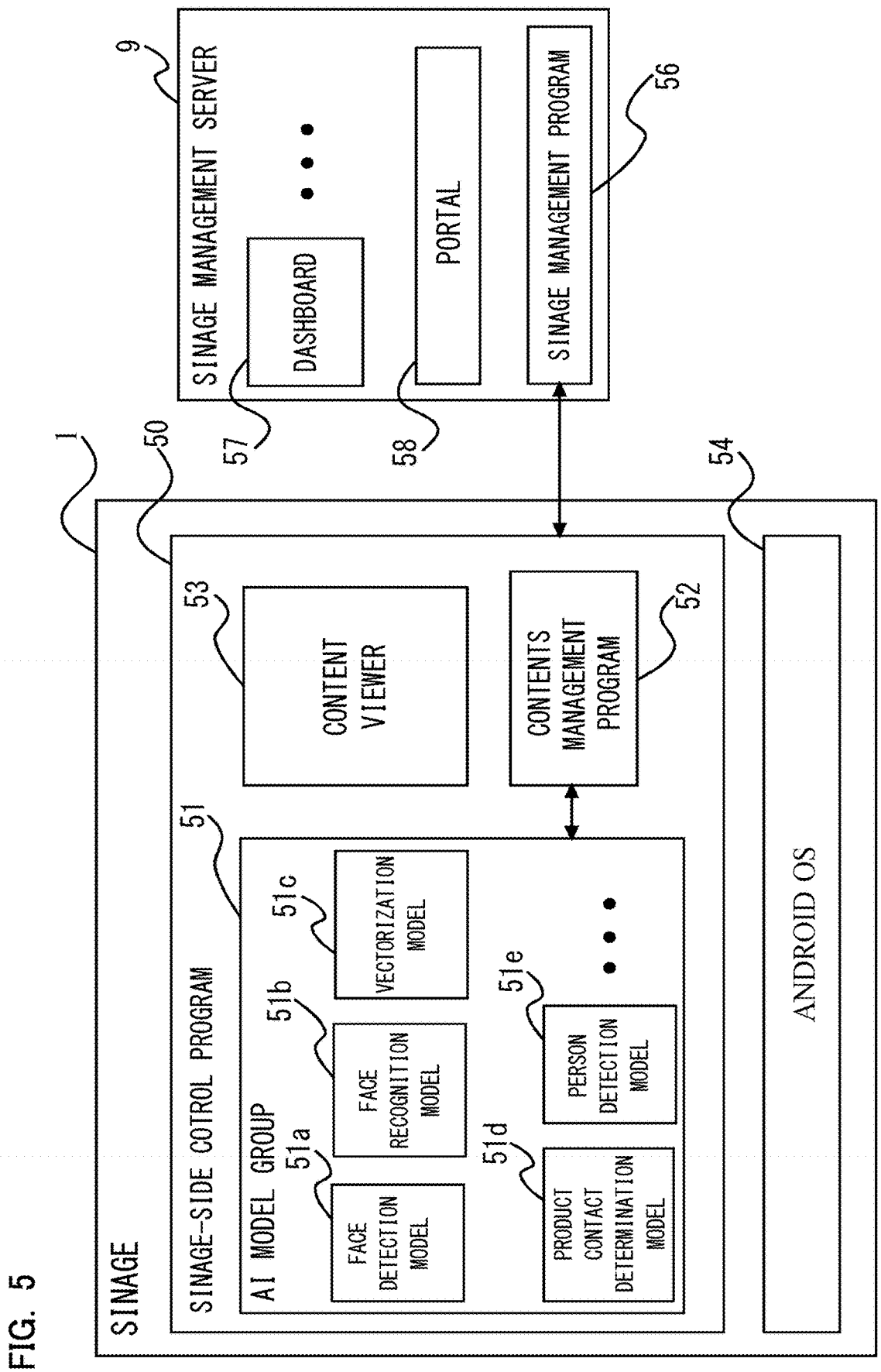
FIG. 5 is a schematic block diagram showing a software architecture of the signage and a signage management server in FIG. 1.

FIG. 5 shows a software architecture of the signage 1 and the signage management server 9 in FIG. 1. The signage 1 stores, in the memory 16 (refer to FIG. 2), a signage-side control program 50 and an Android OS (mobile operating system) 54 shown in FIG. 5. The signage-side control program 50 is mainly formed by AI models 51 consisting of various inference models, a content viewer 53 which is a viewer for video contents, and a contents management program 52 which is a kind of so-called CMS (Contents Management System). The AI models 51 include a face detection model 51*a*, a face recognition (gender/age estimation) model 51*b*, a vectorization model 51*c*, a product contact determination model 51*d*, a person detection model 51*e*, and so on.

The face detection model 51*a* is configured to detect a face of a customer captured in signage-side images input from the built-in camera 2 so as to output coordinate position of the detected face (for example, coordinate representing the center of the face and coordinate area representing the horizontal width and vertical width of the face). The face recognition (gender/age estimation) model 51*b* is configured so that, if the face of the customer detected using the face detection model 51*a* is suitable for the recognition of the attributes of the customer (for example, if the detected face of the customer is front-facing, and if, at the same time, such face has some sufficient size), the face recognition model 51*b* uses a cut-out image of the face of the customer to perform an estimation process of the attributes (gender and age or generation) of the customer. Further, the vectorization model 51*c* is configured to perform a process to vectorize the cut-out image of the face (face image) (detected by the face detection model 51*a*) described above to obtain a vector, and save (store) the thus obtained vector in the memory 16 as a face vector (corresponding to the "person feature" in the claims).

The person detection model 51*e* is configured to detect customers captured in the signage-side images input from the built-in camera 2. The product contact determination model 51*d* is configured so that, based on the skeleton information of each customer captured in each signage-side image as detected by the person detection model 51*e*, the product contact determination model 51*d* determines the posture of each customer in front of the product shelf on which each signage 1 is placed, and based on this posture, determines whether or not each customer has contacted with a product (that the customer has taken the product in hand). Note that the person detection model 51*e* is also used for a process to count viewers of each signage 1 placed on a product shelf (to count the number of customers, whose line of sight or face is directed to the signage 1, among the customers captured in the signage-side images), and further used for consumer rating survey of the signage 1 described later.

Figure 6:
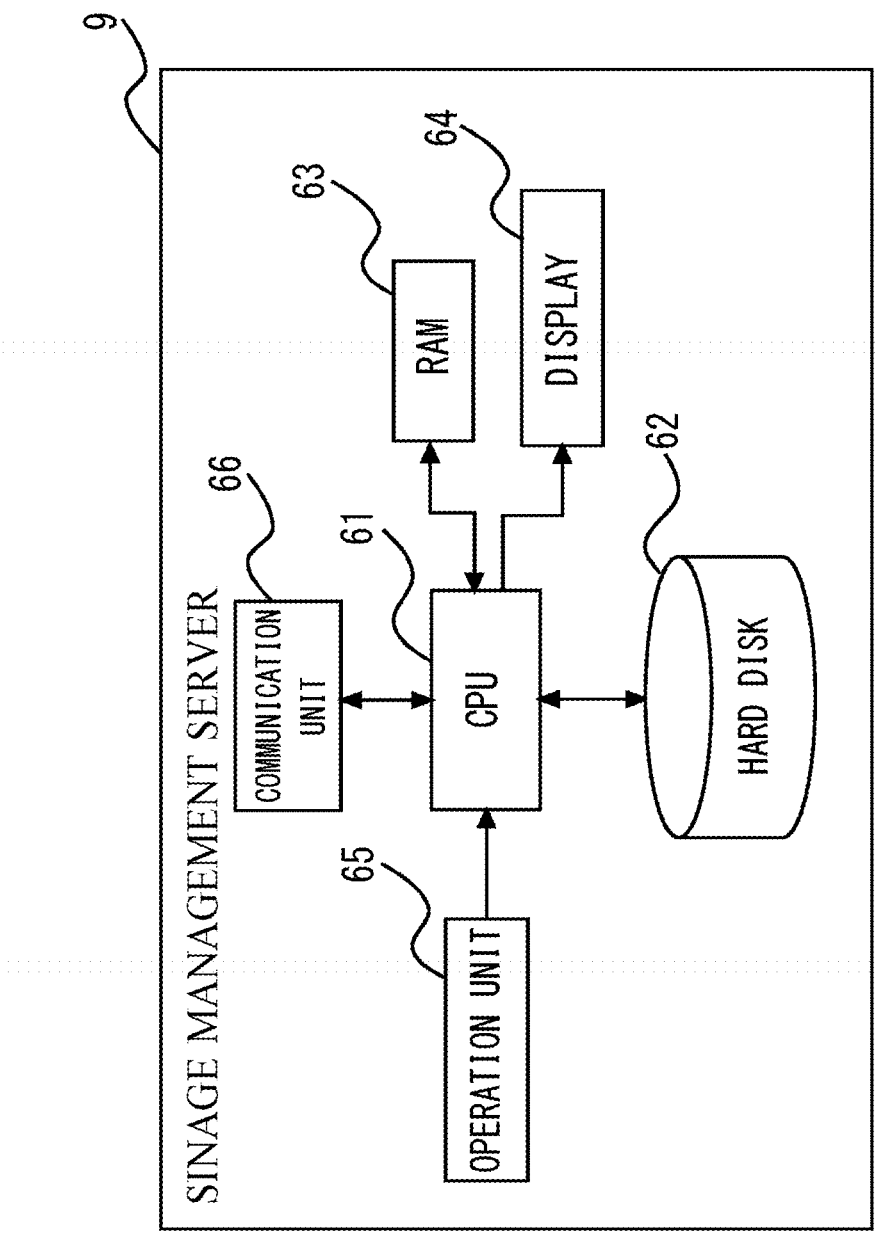
FIG. 6 is a schematic block diagram showing a hardware configuration of the signage management server.

Further, referring to FIG. 5, the signage management server 9 stores a signage management program 56, a dashboard 57 and a portal 58 in a hard disk 62 (refer to FIG. 6). The signage management program 56 is a program to manage each signage 1 in the signage control system 10. The dashboard 57 is a software to aggregate and visualize the statistical information on results of tracking the behavior of each customer, including the attributes (gender and age or generation) and stay time of the viewer (customer) of the advertising content displayed on (the touch panel display 14 of) each signage 1, and also including whether or not the customer has touched a product after looking at the advertising content, and whether or not the customer has bought the product after contacting with the product. The portal 58 is a kind of so-called enterprise portal (software designed so that in order to effectively search and use various information, applications and the like scattered throughout an enterprise, the software integrates and displays these information, applications and the like on the screen of a computer). Applications which can be accessed from the portal 58 include applications to set each advertising content desired to be displayed on the touch panel display 14 of the signage 1, and to also set display conditions for these advertising contents.

Next, referring to FIG. 6, the hardware configuration of the signage management server 9 will be described. The signage management server 9 comprises a CPU 61 configured to control the entire device and perform various operations, a hard disk 62 configured to store various data and programs, a RAM (Random Access Memory) 63, a display 64, an operation unit 65 and a communication unit 66. The programs stored in the hard disk 62 include the signage management program 56, the dashboard 57, and (programs for) the portal 58 that are described above.

Figure 7:
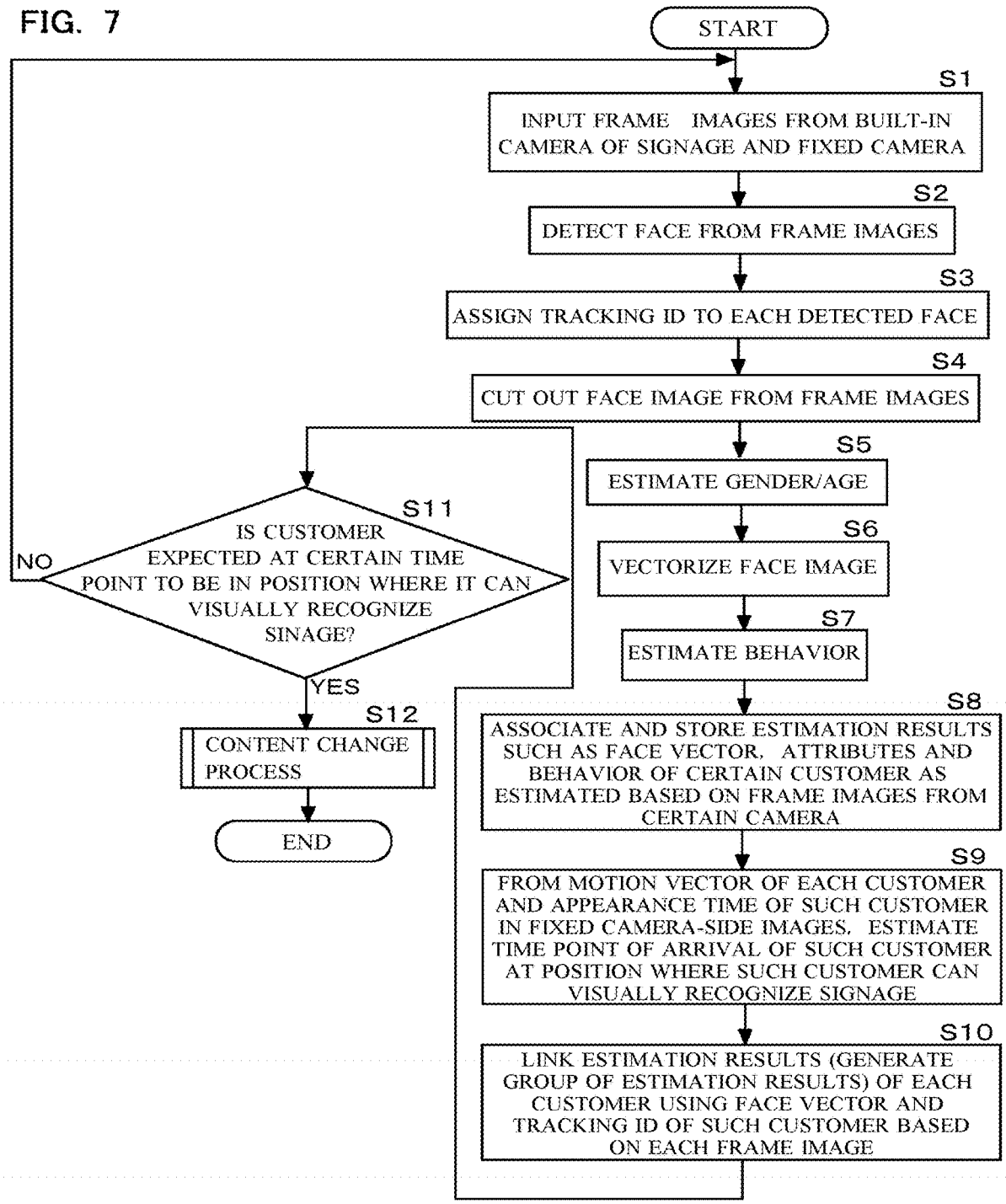
FIG. 7 is a flow chart of a content change control process performed by the signage control system.

Next, referring the flow chart of FIG. 7, an outline of a content change control process performed by the signage control system 10 of the present exemplary embodiment will be described. First, the signage 1-side primary estimation circuitry 41 and the analysis box 4-side primary estimation circuitry 32 detect faces of customers (face images) from the frame images (signage-side images) input from the built-in camera 2 of the signage 1 and the frame images (fixed camera-side images) input from the fixed camera 3, respectively (S1 and S2). Note that the face detection process performed by the signage 1-side primary estimation circuitry 41 uses the face detection model 51*a* described above (refer to FIG. 5), while the face detection process performed by the analysis box 4-side primary estimation circuitry 32 uses the DNN model for face detection process described above, which is included in the learned DNN models for various inference processes stored in the hard disk 22.

To describe the processes from S3 onward, signage 1-side processes and analysis box 4-side processes will be described separately. First, the signage 1-side processes will be described. When the face detection process in S2 is completed, the signage 1-side primary estimation circuitry 41 assigns a tracking ID to each of the faces detected in S2 (S3). More specifically, based on the time point at which each of the signage-side images was captured by the same built-in camera 2, and based on the coordinate position of the face (or the coordinate position and size of the face) detected by the face detection model 51*a* from each of these signage-side images, the signage 1-side primary estimation circuitry 41 assigns the same tracking ID to (the face of) the same customer over the frames so as to perform a tracking process of customers captured by the same built-in camera 2.

Then, if the signage 1-side primary estimation circuitry 41 detects, for the first time, a suitable face for the recognition of the attributes of the customer (for example, if (an image of) a face is detected such that the face is front-facing, and, at the same time, the face has some sufficient size) from the faces assigned with a specific tracking ID, the signage 1-side primary estimation circuitry 41 cuts out the image of the face (face image) (suitable for the attribute recognition) from the frame images (signage-side images) serving as a source for detection (S4). Subsequently, the signage 1-side primary estimation circuitry 41 uses the face recognition (gender/age estimation) model 51b described above to estimate the attributes (gender and age or generation) of such customer based on the face image (S5).

Further, the signage 1-side primary estimation circuitry 41 uses the vectorization model 51c described above to perform a process to vectorize the face image to obtain a face vector (corresponding to the "person feature" in the claims) (S6). In addition, the signage 1-side primary estimation circuitry 41 uses the product contact determination model 51d described above and the like to estimate the behavior of each customer in front of a product shelf on which the signage 1 is placed, including whether or not such customer has contacted with a product (that the customer has taken the product in hand) (S7). Note that at least when the later-described DNN arrival time estimation model learns, the signage 1-side primary estimation circuitry 41 performs a process to obtain motion tracking of each customer (combinations of the center points and time points of bounding boxes for each customer) captured in the signage-side images captured by the built-in camera 2.

The signage 1-side cooperative processing circuitry 42 is configured to send, to the analysis box 4, the estimation results using the primary estimation circuitry 41 described above, more specifically, the estimation results of the face vector, the attributes, the (customer) behavior, the tracking ID and the motion tracking for each specific customer based on the frame images from the built-in camera 2 of each specific signage 1. The analysis box 4-side cooperative processing circuitry 37 is configured to receive the various estimation results from the signage 1 (the face vector, attributes, behavior, tracking ID and motion tracking of such specific customer), and then associate and store, in the storage device 33, these face vector, attributes, behavior, tracking ID and motion tracking of such specific customer as estimated based on the frame images from the built-in camera 2 of such signage 1 (S8).

Next, the analysis box 4-side processes will be described. When the face detection process in S2 is completed, the analysis box 4-side primary estimation circuitry 32 assigns a tracking ID to each of the faces detected in S2 (S3). More specifically, based on the time point at which each of the fixed camera-side images was captured by the same fixed camera 3, and based on the coordinate position of the face (or the coordinate position and size of the face) detected by the DNN model for face detection process (stored in the hard disk 22) described above from each of these fixed camera-side images, the analysis box 4-side primary estimation circuitry 32 assigns the same tracking ID to (the face of) the same customer over the frames so as to perform a tracking process of customers captured by the same fixed camera 3.

Then if, like the signage 1-side primary estimation circuitry 41 described above, the analysis box 4-side primary estimation circuitry 32 detects, for the first time, a suitable face for the recognition of the attributes of the customer from the faces assigned with a specific tracking ID, the analysis box 4-side primary estimation circuitry 32 cuts out the face image from the frame images (fixed camera-side images) serving as a source for detection (S4). Subsequently, the analysis box 4-side primary estimation circuitry 32 uses the DNN model for attribute estimation (face recognition) process (stored in the hard disk 22) described above to estimate the attributes (gender and age or generation) of such customer based on the face image (S5). Further, the analysis box 4-side primary estimation circuitry 32 uses the DNN model for face vector extraction (stored in the hard disk 22) described above to perform a process to vectorize the face image to obtain a face vector (S6).

In addition, the analysis box 4-side primary estimation circuitry 32 uses the DNN model for behavior estimation process (stored in the hard disk 22) described above to estimate the behavior of each customer (customer behavior) captured in the fixed camera-side images (S7). Note that the analysis box 4-side primary estimation circuitry 32 also performs a process to obtain motion tracking of each customer (combinations of the center points and time points of bounding boxes for each customer) captured in the fixed camera-side images captured by each fixed camera 3, and from this motion tracking of each customer, obtain a motion vector (refer to FIG. 8) of each customer captured by each fixed camera 3. The analysis box 4-side storage device 33 associates and stores the estimation results using the primary estimation circuitry 32 described above, more specifically, the face vector, the attributes, the (customer) behavior, the tracking ID, the motion tracking and the motion vector for each specific customer as estimated based on the frame images from each specific fixed camera 3 (S8).

Next, from a motion vector of each customer captured in the fixed camera-side images, and from a time point at which the each customer appears in the fixed camera-side images, the arrival time estimation circuitry 34 of the analysis box 4 estimates arrival time of the each customer at which such customer is expected to arrive at a position where such customer can visually recognize a content displayed on each signage 1 (S9). For example, if the arrival time estimation circuitry 34 is implemented by using a learned DNN arrival time estimation model (learned DNN model for arrival time estimation), the arrival time of the each customer, at which such customer is expected to arrive at the position where such customer can visually recognize the content displayed on each signage 1, can be estimated by inputting the motion vector (motion vector of the each customer captured by each fixed camera 3) obtained by the primary estimation circuitry 32 as described above to the learned DNN model for arrival time estimation.

Figure 8:
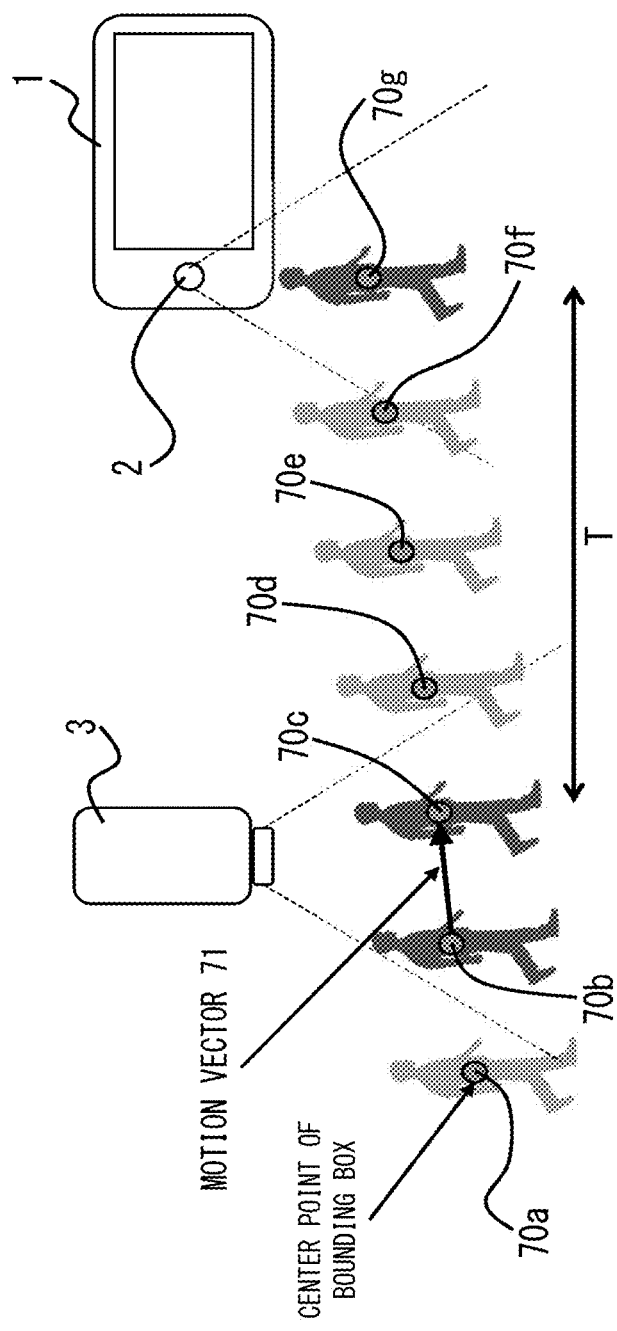
FIG. 8 is an explanatory view showing a learning process and an inference process of a DNN (Deep Neural Network) arrival time estimation model forming an arrival time estimation circuitry in FIG. 4.

The learning of the DNN arrival time estimation model is done as follows. Among the analysis box 4-side functional blocks (refer to FIG. 4) in the signage control system 10 of the present exemplary embodiment, the arrival time estimation circuitry 34, the estimation result linkage circuitry 35 and the content change circuitry 36 are disabled in function (not used), while the signage 1-side primary estimation circuitry 41 and the analysis box 4-side primary estimation circuitry 32 are used to collect motion tracking data of each customer captured in the frame images captured by the built-in camera 2 and the fixed camera 3. Here, the above-described motion tracking data of each customer means combinations of the center points and time points of bounding boxes for each customer, an example of which is shown in FIG. 8 where reference numerals 70a to 70g represent the center points of bounding boxes for such customer.

From the thus collected motion tracking data and motion vectors 71 for each customer for a given time period, the analysis box 4-side primary estimation circuitry 32 generates combinations of: the motion vectors 71 for each customer captured by each fixed camera 3; a time point at which such customer appears in the images captured by such fixed camera 3 (hereafter referred to as "time point of appearance in the fixed camera 3"); and a time point at which such customer appears in the images captured by the built-in camera 2 of each signage 1 (hereafter referred to as "time point of appearance in the signage 1"). Note that in the example shown in FIG. 8, the "time point of appearance in the fixed camera 3" is a time point corresponding to the center point 70c at the arrow end of the motion vector 71 among the center points of the bounding boxes of the customer appearing in the images captured by the fixed camera 3.

Then, the DNN model to estimate a time period T from the "time point of appearance in the fixed camera 3" to the "time point of appearance in the signage 1" (namely the above-described DNN arrival time estimation model) is allowed by the CPU 21 of the analysis box 4 to learn using the combined (aggregated) data of the motion vectors 71, the "time point of appearance in the fixed camera 3" and the "time point of appearance in the signage 1" as learning data. The hard disk 22 includes a number of such DNN arrival time estimation models equal to the number of combinations of the fixed cameras 3 and the signages 1 in the store S. For example, if the number of fixed cameras 3 is 3, and the number of signages 1 is 4, the DNN models stored in the hard disk 22 include 12 (12 kinds of) DNN arrival time estimation models.

When each learned DNN arrival time estimation model generated by the learning described above infers, the arrival time estimation circuitry 34 of the analysis box 4 inputs the motion vectors 71 obtained by the analysis box 4-side primary estimation circuitry 32 to the each learned DNN arrival time estimation model so as to obtain the time period T (time period from a time point at which a customer appears in an image captured by a specific fixed camera 3 to a time point at which such customer appears in an image captured by the built-in camera of a specific signage 1). Thereafter, the arrival time estimation circuitry 34 of the analysis box 4 adds the time period T to the time point at which such customer appears in the image captured by the specific fixed camera 3 (fixed camera-side image), so as to estimate arrival time of such customer at which such customer is expected to arrive at a position where such customer can visually recognize a content displayed on the specific signage 1 (estimate time point at which such customer is expected to appear in the images captured by the built-in camera 2 of the specific signage 1).

When the signage control system 10 is operated (when each learned DNN arrival time estimation model described above infers), the arrival time estimation circuitry 34 of the analysis box 4 uses each of the learned DNN arrival time estimation models (which are equal in number to the combinations of the fixed cameras 3 and the signages 1) to estimate arrival time at which each customer appearing in the images captured by each fixed camera 3 is expected to arrive at a position where such customer can visually recognize a content displayed on each signage 1. Based on these estimation results, the arrival time estimation circuitry 34 predicts a person who, at a specific time point, is expected to be in the position where such person can visually recognize the content displayed on the each signage 1.

Now, referring back to FIG. 7, the processes, after S9 above, performed by the signage control system 10 will be described. When the arrival time estimation process in S9 above is completed, the estimation result linkage circuitry 35 of the analysis box 4 uses the face vector and the tracking ID stored in the storage device 33 for each customer, who is expected to arrive at a position where such customer can visually recognize a content on each signage 1 as a result of the estimation using the arrival time estimation circuitry 34, to link the estimation results based on the frame images from multiple ones of the cameras (built-in cameras 2 of the signages 1 and the fixed cameras 3) for the same customer so as to generate a group of estimation results for each customer (S10). As described above, the estimation result linkage process using the estimation result linkage circuitry 35 is performed using a DNN model for the re-identification process for each customer (customer ReID process). Thus, this signage control system 10 can start the re-identification process for each customer (customer ReID process) before each customer arrives at a position where such customer can visually recognize a content on each signage 1. Note that the DNN model for the customer re-identification process is a learned DNN model which re-identifies the same customer captured in the frame images from multiple ones of the cameras (built-in cameras 2 of the signages 1 and the fixed cameras 3) and assigns the same global ID (customer ID over the cameras) to the same customer.

When the process of generating the group of estimation results in S10 above is completed, the content change circuitry 36 of the analysis box 4 operates so that if a customer is expected to be in the position, at a specific time point, where such customer can visually recognize a content on the signage 1 (more precisely, if it is estimated that there is a customer, at a specific time point, who is expected to have arrived at a position where such customer can visually recognize a content on the signage 1, and who is also expected to be in the position for a predetermined time or longer where such customer can visually recognize the content on the signage 1) as a result of the estimation using the arrival time estimation circuitry 34 (YES in S11), the content change circuitry 36 changes the content displayed on (the touch panel display 14 of) the signage 1 to another (S12), based on the data contained in the group of estimation results generated by the estimation result linkage circuitry 35, more specifically, based on the attributes (gender and age or generation) of such customer who is expected to be in the position where such customer can visually recognize the content displayed on the signage 1, and also based on the preceding behavior of such customer before then.

In other words, for each customer who is expected to arrive at a position where such customer can visually recognize a content on the signage 1 as a result of the estimation using the arrival time estimation circuitry 34, the content change circuitry 36 of the analysis box 4 operates so that, at a time point based on the estimated arrival time of such customer at which such customer is expected to arrive at the position where such customer can visually recognize the content on the signage 1 as estimated by the arrival time estimation circuitry 34 (for example, at the time point of the estimated arrival time itself, or at a time point a predetermined time after the estimated arrival time), the content change circuitry 36 changes the content displayed on the signage 1 to another based on the attributes and the preceding behavior of such customer which are contained in the group of estimation results generated by the estimation result linkage circuitry 35. Note that if there is a variation in the attributes of a customer having arrived at a position where such customer can visually recognize a content on the signage 1, such attributes being contained in the group of estimation results described above (more specifically, if all the attributes of such customer estimated based on the frame images from the built-in cameras 2 of the signages 1 and the attributes of such customer estimated based on the frame images from the fixed cameras 3 are not completely the same), then the content change circuitry 36 changes the content displayed on the signage 1 to another based on the most likely (the most numerous) attributes among these attributes.

Figure 9:
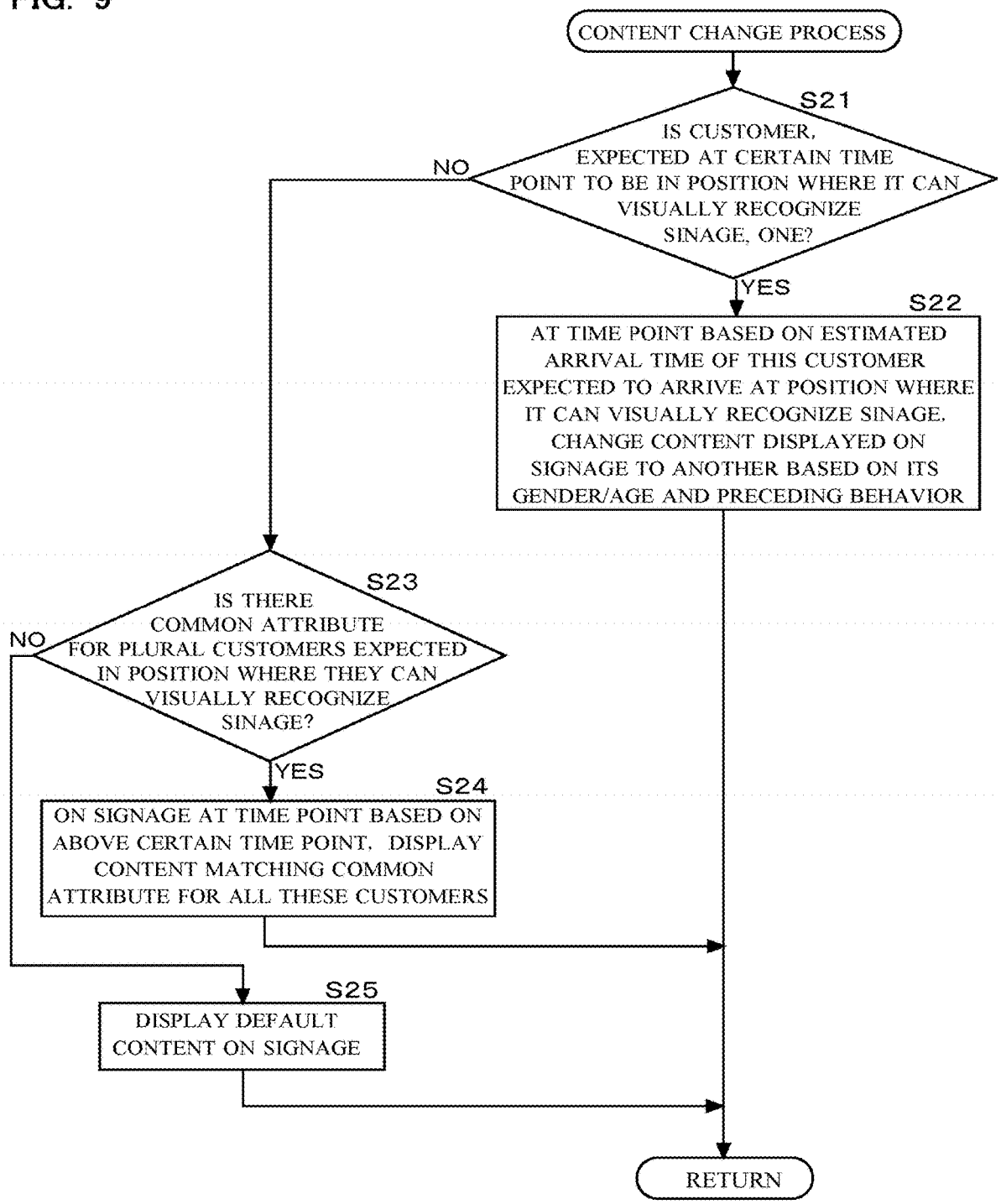
FIG. 9 is a flow chart of a content change process of S12 in FIG. 7.

Next, referring to the flow chart of FIG. 9, the content change process of S12 in FIG. 7 above will be described in detail. If, as a result of the estimation using the arrival time estimation circuitry 34, the number of customers, at a specific time point, who are expected to be in a position where such customers can visually recognize a content on the signage 1 (more precisely, customers at a specific time point who are expected to have arrived at the position where such customers can visually recognize the content on the signage 1, and who are also expected to be in the position for a predetermined time or longer where such customers can visually recognize the content on the signage 1) is determined to be one (YES in S21), the content change circuitry 36 of the analysis box 4 operates so that, at a time point based on the estimated arrival time of such customer at which such customer is expected to arrive at the position where such customer can visually recognize the content on the signage 1, the content change circuitry 36 changes the content displayed on the signage 1 to another based on the attributes (gender and age or generation) and the preceding behavior of such customer (preceding behavior of such customer before then, including contact of such customer with products, viewing time of such customer to view such signage 1, viewing time of such customer to view a signage 1 placed on another product shelf, and so on) (S22).

In other words, the content change circuitry 36 of the analysis box 4 operates so that at a time point based on the estimated arrive time of such customer at which such customer is expected to be in the position where such customer can visually recognize the content on the signage 1 (for example, at the time point of the estimated arrival time itself, or at a time point a predetermined time after the estimated arrival time), the content change circuitry 36 changes the content on the signage 1 to another which is considered to match such customer, considering the attributes and the preceding behavior of such customer who is expected to be in the position where such customer can visually recognize the content on the signage 1.

Figure 10:
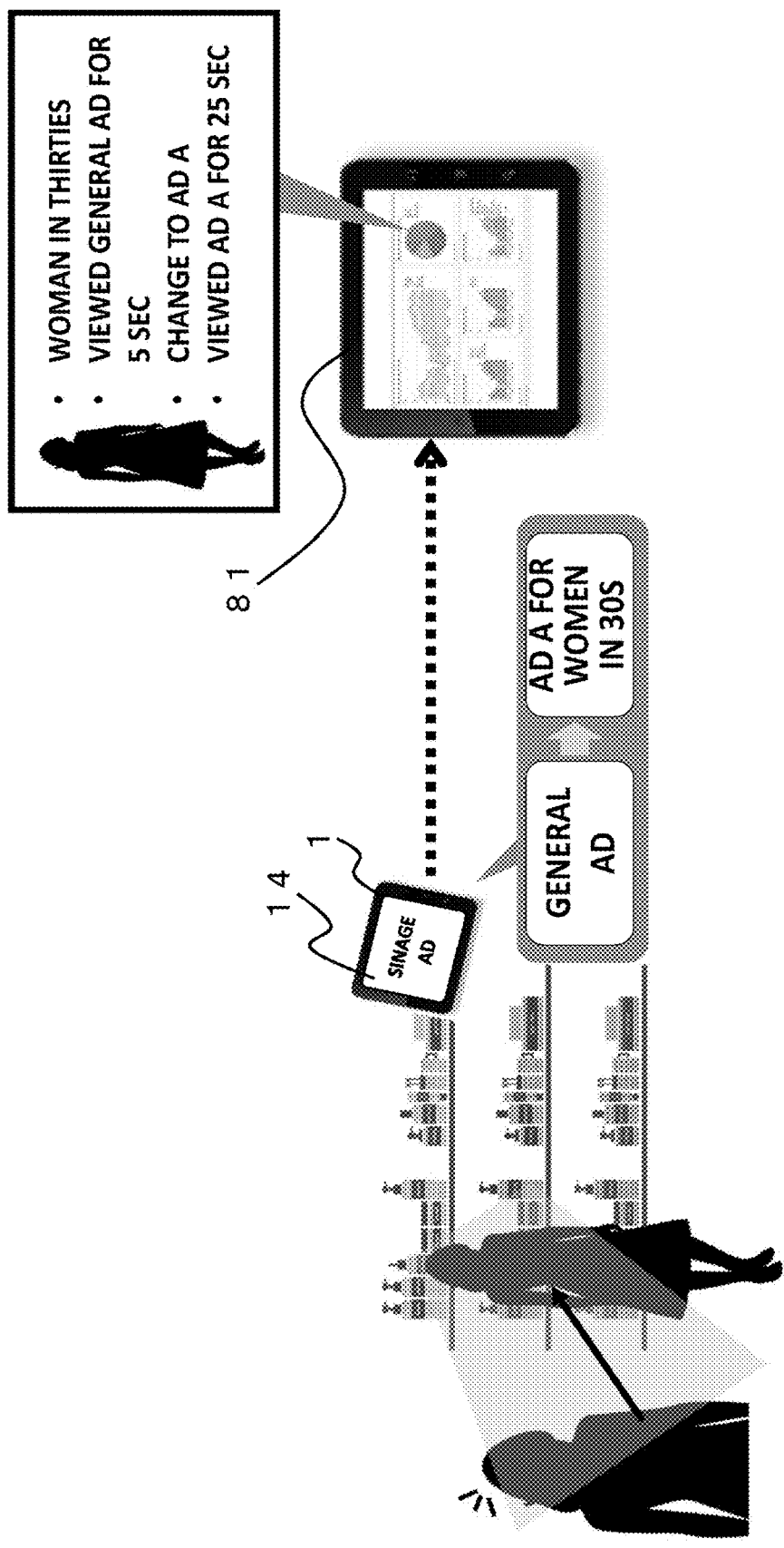
FIG. 10 is an explanatory view showing an example of the content change process.

For example, as shown in FIG. 10, if, at a specific time point, a customer who is a woman in her thirties is expected to arrive at a position where such customer (she) can visually recognize a content on a specific signage 1, and if, at such time point, no other person is in the position where such person can visually recognize the content on such signage 1, then the content change circuitry 36 of the analysis box 4 operates so that at a time point based on the estimated time point at which such customer (she) is expected to arrive at the position where such customer (she) can visually recognize the content on the signage 1, the content change circuitry 36 changes the content displayed on the signage 1 to another based on the attributes of such customer (woman in her thirties) and on the preceding behavior of such customer (her) (for example, viewing time of such customer to view the signage 1) (S22).

More specifically, for example, as shown in FIG. 10, the content change circuitry 36 of the analysis box 4 operates so that at a time point when 5 seconds of viewing by such customer to view such signage 1 has passed (at a time point when the behavior of such customer to view such signage 1 has continued for 5 seconds after the arrival time of such customer), the content change circuitry 36 changes the advertising content displayed on the touch panel display 14 of such signage 1 from a general advertisement to a specific advertisement A which matches or corresponds to the attributes of such customer (woman in her thirties). Thus, only by placing a signage 1 on a product shelf or the like in the store S, the signage control system 10 of the present exemplary embodiment enables interactive advertising display (real-time advertising display change matching or corresponding to the attributes and the preceding behavior, such as viewing time, of the viewer or customer) linked to the contents management program 52 (refer to FIG. 5) which is a kind of CMS.

Further, the CPU 61 (refer to FIG. 6) of the signage management server 9 collects information of the attributes and behavior of each customer who is expected to be in a position where such customer can visually recognize a content on each signage 1 as described above, information of viewer rating of each signage 1, and other information so as to analyze these information and store the analysis results in the hard disk 62. A manager of each store, an advertiser of an advertisement (advertising content) displayed on each signage 1 and other person can access (the dashboard 57 of) the signage management server 9 (refer to FIG. 5) from its own personal computer 81 so as to check and use these information (analysis results) including the attributes and behavior of each customer and the viewer rating of each signage 1 described above as shown in FIG. 10. Here, the viewer rating of each signage 1 described above means a ratio of the number of customers with the line of sight or face directed to each signage 1 to the total number of customers captured in the signage-side images of each signage 1 (customers who have passed in front of each signage 1). Note that the personal computer 81 of each of the manager, the advertiser of the advertisement (advertising content) and other person can be designed to receive, through a data distribution API (Application Programming Interface), the analysis results of each customer described above, such as the attributes and behavior, stored in the hard disk 62 of the signage management server 9.

Referring back to FIG. 9, if the number of customers, at a specific time point, who are expected to be in the position where such customers can visually recognize the content on the signage 1 is determined in S21 above to be plural (NO in S21), the content change circuitry 36 of the analysis box 4 determines whether or not, in the attributes estimated by the signage 1-side primary estimation circuitry 41 or the analysis box 4-side primary estimation circuitry 32 for these plural customers, there is a common attribute for all these plural customers (S23). If there is a common attribute for all the plural customers as a result of the determination of S23 above (YES in S23), the content change circuitry 36 of the analysis box 4 displays, on the touch panel display 14 of the signage 1, a content matching or corresponding to such common attribute at a time point based on the specific time point described above (time point at which the plural customers are expected to be in the position where they can visually recognize the content on the signage 1) (S24). Note that the time point based on the specific time point described above can be the specific time point itself, or a time point a predetermined time (for example, 5 seconds) after the specific time point. On the other hand, if a common attribute for all the plural customers is absent as a result of the determination of S23 (NO in S23), the content change circuitry 36 of the analysis box 4 displays a predetermined standard (default) content on the touch panel display 14 of the signage 1 (S25).

As shown in FIG. 11, in the signage control system 10 of the present exemplary embodiment, the analysis box 4 is used as if it were a hub for the plurality of signages 1 and the plurality of fixed cameras 3 placed in store S so as to enable advanced video analysis by merging the results of analyzing the images captured by (the built-in cameras 2 of) the signages 1 and the fixed cameras 3 (merging the estimation results of the attributes, behavior and the like of each customer). In order to merge the analysis results of the captured images by the signages 1 and the fixed cameras 3 in the present signage control system 10, the estimation result linkage circuit 35 is used for re-identifying each customer based on its face vector (customer ReID process) so as to link the estimation results (analysis results) based on the frame images from multiple ones of the cameras (built-in cameras 2 of the signages 1 and the fixed cameras 3) for the same customer.

Thus, the present signage control system 10 can track not only the attributes (gender and age or generation) of each customer having arrived at a position where such customer can visually recognize a content on the signage 1, and the viewer rating of each advertising content displayed on the signage 1 by such customers, but also the behavior of such customer, including whether or not such customer has contacted with a product after viewing the advertising content displayed on the signage 1, and whether or not such customer has bought the product it has contacted with. Further, a manager of each store, an advertiser of the advertising content displayed on the signage 1 and other person can access the signage management server 9 on cloud C from its own personal computer 81 to check (see) (information of) the tracking result of the behavior of such customer, including whether or not such customer has contacted with the product after viewing the advertisement (advertising content) described above, and whether or not such customer has bought the product it has contacted with. As shown in FIG. 11, an example of the (information of) the tracking result of the behavior of such customer is "that a woman in her thirties viewed (the advertising content of) the signage 1 in the cosmetics corner (cosmetics sales floor) for 25 seconds, and as a result, contacted with a cosmetic product XX (took the cosmetic product XX in hand), and thereafter, stayed in the confectionery corner (confectionery sales floor) for 15 seconds, and bought the cosmetic product XX, and that her stay time in the store was 12 minutes".

Note that in order for the present signage control system 10 to check whether or not, in the behavior of the customer described above, the customer has bought the product it has contacted with, the CPU 21 (mainly the estimation result linkage circuitry 35) of the analysis box 4 compares a face vector estimated based on the frame images from the signage 1 placed on the product shelf, which places the product the customer has contacted with, and a face vector estimated based on the frame images from the signage 1 placed in front of the POS register 7 (which has the built-in camera 2 capable of capturing the customer buying the product), so as to find the timing when a customer having contacted with a specific product pays for such product. Further, whether a specific product contacted by a customer is included in the products bought by the customer at the time of payment is determined also by the CPU 21 by comparing the product, which is captured in the frame images from the signage 1 placed on the product shelf and which has been contacted by the customer, and the products which have been subjected to bar code scanning by the POS register 7.

As described above, the signage control system 10 of the present exemplary embodiment can track not only the attributes of each customer having arrived at a position where such customer can visually recognize a content on the signage 1, and the viewer rating of each advertising content displayed on the signage 1, but also the behavior of such customer, including whether or not such customer has contacted with a product after viewing the advertising content displayed on the signage 1, and whether or not such customer has bought the product it has contacted with. Thus, the present signage control system 10 can introduce an affiliate (performance-based or result reward-type) advertising system, such as Web advertising, for advertising contents to be displayed on a signage 1 placed in a real store.

As described in the foregoing, according to the signage control system 10 and the signage control program (signage-side control program 50 shown in FIG. 5 and learned DNN models for various inference processes shown in FIG. 3) of the present exemplary embodiment, an advertising content displayed on a signage 1 is changed to another based on the attributes (gender and age or generation) of a customer who is expected to be in a position where such customer can visually recognize the content on the signage 1, and also based on preceding behavior of such customer before then, all of which are contained in a group of estimation results generated by linking estimation results based on frame images from multiple ones of the cameras (built-in cameras 2 of the signages 1 and fixed cameras 3) for the same customer.

Thus, the advertising content displayed on the signage 1 can be changed to another, considering not only the attributes of a customer expected to be in a position where such customer can visually recognize the content on the signage 1, but also the preceding behavior of such customer before such customer has come in front of the signage 1 (to a position where such customer can visually recognize the content on the signage 1). Therefore, as compared with the conventional signage control system disclosed in Japanese Laid-open Patent Publication 2020-160780, which changes an advertising content on a signage 1 to another based only on the attributes and behavior of a customer analyzed based on the frame images of the customer captured by a signage-side camera, it is possible to display an advertising content which better matches or corresponds to the customer in front of the signage 1 (in a position where the customer can visually recognize the content on the signage 1).

Further, in contrast to the conventional signage control system disclosed in Japanese Laid-open Patent Publication 2020-160780, which estimates the attributes and behavior of a customer from only the frame images (signage-side images) of the customer or other person captured by a signage-side camera, the signage control system 10 of the present exemplary embodiment is designed to use not only the signage-side images but also frame images (fixed camera-side images) of a customer captured by a plurality of fixed cameras 3 to estimate the face vector, attributes and behavior of such customer captured in these frame images. Thus, in contrast to the conventional signage control system disclosed in Japanese Laid-open Patent Publication 2020-160780, the process of estimating the attributes, behavior and the like of a customer who is expected to be in a position where such customer can visually recognize a content on a signage 1 can be started by using the fixed camera-side images having been captured prior to the signage-side images, before such customer comes into the position where such customer can visually recognize the content on the signage 1. Therefore, it is possible to immediately display a content to attract the interest of such customer when such customer comes into a position where such customer can visually recognize the content on the signage 1.

Further, according to the signage control system 10 of the present exemplary embodiment, for each customer who is expected to arrive at a position where such customer can visually recognize a content on the signage 1 as a result of the estimation using the arrival time estimation circuitry 34, the content change circuitry 36 operates so that, at a time point based on the estimated arrival time of such customer at which such customer is expected to arrive at the position where such customer can visually recognize the content on the signage 1 as estimated by the arrival time estimation circuitry 34, the content change circuitry 36 changes the content displayed on the signage 1 to another based on the attributes and the preceding behavior of such customer which are contained in a group of estimation results generated by the estimation result linkage circuitry 35.

Thus, at a time point based on the estimated arrival time of each such customer at which such customer is expected to arrive at the position where such customer can visually recognize the content on the signage 1 (for example, at the time point of the estimated arrival time itself, or at a time point 5 seconds after the estimated arrival time), the content change circuitry 36 can change the content on the signage 1 to an advertising content which corresponds to the attributes of such customer expected to be in the position where such customer can visually recognize the content on the signage 1, and corresponds to the preceding behavior of such customer before then, and which thus matches such customer. Therefore, it is possible to display an advertising content at the expected timing of arrival of a customer at a position where such customer can visually recognize the content on the signage 1, making it possible to surely arouse the interest of such customer.

Further, according to the signage control system 10 of the present exemplary embodiment, the estimation result linkage circuitry 35 uses the face vector contained in each estimation result stored in the storage device 33 for each customer, who is expected to arrive at a position where such customer can visually recognize a content on each signage 1 as a result of the estimation using the arrival time estimation circuitry 34, to link the estimation results based on the frame images from multiple ones of the cameras (built-in cameras 2 of the signages 1 and the fixed cameras 3) for the same customer so as to generate a group of estimation results for each customer. Thus, the target of the estimation result linkage process using the estimation result linkage circuitry 35 can be narrowed down to the above-described estimation results for each customer expected to arrive at the position where such customer can visually recognize the content on the signage 1. Therefore, it is possible to reduce the load of the process of the CPU 21 and the (inference) chips 24*a* to 24*h* of the analysis box 4.

Further, the signage control system 10 of the present exemplary embodiment is designed so that if the number of customers, at a specific time point, who are expected to be in the position where such customers can visually recognize the content on the signage 1 is determined to be plural, an advertising content matching or corresponding to a common attribute for these plural customers in the attributes estimated by the primary estimation circuitries (primary estimation circuitry 32 of the analysis box 4 and primary estimation circuitry 41 of the signage 1) for these plural customers is displayed on the signage 1. Thus, if the number of customers, at a specific time point, who are expected to be in the position where such customers can visually recognize the content on the signage 1 is plural, an advertising content optimized for all these customers, not an advertising content matching a specific customer, can be displayed, and therefore, it is possible to protect the privacy of each of these customers.

Further, the signage control system 10 of the present exemplary embodiment is designed to display a predetermined standard content on the signage 1 if the number of customers, at a specific time point, who are expected to be in the position where such customers can visually recognize the content on the signage 1 is determined to be plural, and if a common attribute for these plural customers is absent in the attributes estimated by the primary estimation circuitries (primary estimation circuitry 32 of the analysis box 4 and primary estimation circuitry 41 of the signage 1) for these plural customers. Thus, it is possible to protect the privacy of each of these customers.

MODIFIED EXAMPLES

It is to be noted that the present invention is not limited to the above-described exemplary embodiment, and various modifications are possible within the spirit and scope of the present invention. Modified examples of the present invention will be described below.

Modified Example 1

The exemplary embodiment described above has shown an example, in which the signage 1 is of a tablet terminal type. However, the signage which can be used in the present invention is not limited to this, and can be formed by connecting a USB-connectable Web camera and a HDMI (High-Definition Multimedia Interface)-connectable display to a STB (Set Top Box) with communication function. This makes it possible to apply the signage control system of the present invention to a signage control system using a large size signage, and a signage control system using a signage of a various size.

Modified Example 2

In the exemplary embodiment described above, the arrival time estimation circuitry 34 is designed so that from the motion vector for each customer captured in the fixed camera-side images, and from the time point at which such customer appears in the fixed camera-side images, the arrival time estimation circuitry 34 estimates an arrival time of such customer at a position where such customer can visually recognize a content on a signage 1. However, the arrival time estimation circuitry which can be used in the present invention is not limited to this, and can be designed so that, for example, from motion tracking of each customer (combinations of the center points and time points of bounding boxes for such customer) as estimated by the signage-side primary estimation circuitry, and from motion tracking of such customer as estimated by the analysis box-side primary estimation circuitry, the arrival time estimation circuitry estimates the arrival time of such customer at a position where such customer can visually recognize the content on the signage.

Modified Example 3

Further, in the exemplary embodiment described above, if the number of customers, at a specific time point, who are expected to be in the position where such customers can visually recognize the content on the signage 1 is plural, and if there is a common attribute for these plural customers in the attributes estimated by the primary estimation circuitries for these plural customers, an advertising content matching or corresponding to the common attribute for these plural customers is displayed on the signage 1, while a predetermined standard content is displayed on the signage 1 if a common attribute for these plural customers is absent.

However, the advertising content change method which can be used in the present invention is not limited to this, and can be designed to unconditionally display a predetermined standard content on the signage if the number of customers, at a specific time point, who are expected to be in the position where such customers can visually recognize the content on the signage is plural. The advertising content change method can also be designed so that if the number of customers, at a specific time point, who are expected to be in the position where such customers can visually recognize an advertising content on the signage is plural, the method finds a customer in these plural customers who has been for the longest time (stay time) in the position where such customer can visually recognize the advertising content on the signage, or who has been viewing the advertising content for the longest time, so as to display, on the signage 1, an advertising content matching or corresponding to the attributes and preceding behavior of such customer.

Modified Example 4

Further, in the exemplary embodiment described above, the signage 1-side primary estimation circuitry 41 is designed to estimate, based on the signage-side images, a face vector for identifying a customer in the signage-side images, and the attributes and behavior of such customer captured in the signage-side images. However, the present invention is not limited to this, and can be designed so that the analysis box-side primary estimation circuitry not only performs the estimation process of the face vector, attributes and (customer) behavior of a customer captured in the fixed camera-side images, but also performs the estimation process of the face vector, attributes and behavior of a customer captured in the signage-side images.

Modified Example 5

Further, the exemplary embodiment described above has shown an example, in which the person feature is a face vector obtained by vectorizing a face image of a customer. However, the person feature in the present invention is not limited to this, and can be a customer vector obtained by vectorizing an image of the entire body of a customer, or can be any feature of the face or body of a customer (for example, an outline of a face, a texture of a face such as spots, wrinkles and sagging, a distance between eyes, and so on).

Modified Example 6

Further, in the exemplary embodiment described above, the analysis box 4 is designed to comprise the video input circuitry 31 and the primary estimation circuitry 32. However, the analysis box 4 is not limited to this, and can be designed so that an AI (Artificial Intelligence) camera with so-called edge computing function is used for the camera placed in each store, and an application package comprising learned DNN models for inference processes such as face detection process, attribute estimation (face recognition) process, face vector extraction process, behavior estimation process is installed on the AI camera so as to allow the AI camera to have the functions of the video input circuitry and the primary estimation circuitry described above.

Modified Example 7

The exemplary embodiment described above has shown an example, in which the signage control system 10 comprises only the signage management server 9 and the not shown POS server on cloud C. However, the signage control system can comprise another server on cloud C. For example, the signage control system can comprise, on cloud C, a management server to manage a number of analysis boxes placed in each store, and fixed cameras connected to these analysis boxes, or comprise an AI analysis server to convert, for output, information on analysis results from the analysis box to data to facilitate the use of applications for various uses such as marketing, crime prevention and so on.

These and other modifications will become obvious, evident or apparent to those ordinarily skilled in the art, who have read the description. Accordingly, the appended claims should be interpreted to cover all modifications and variations which fall within the spirit and scope of the present invention.

The invention claimed is:

1. A signage control system comprising a signage, a signage-side camera to capture images in front of the signage and at least one surveillance camera to capture a given capture area, wherein the signage control system further comprises:
a primary estimation circuitry configured to use signage-side images which are frame images from the signage-side camera and surveillance-side images which are frame images from the at least one surveillance camera so as to estimate a person feature of each person in these frame images, and also estimate attributes and behavior of the each person captured in these frame images;
a storage device configured to associate and store results of estimations of the person feature, the attributes and the behavior of each specific person as estimated by the primary estimation circuitry using the frame images from each specific one of the signage-side cameras and the at least one surveillance camera;
an estimation result linkage circuitry configured to use the person feature stored in the storage device to link the results of estimations based on the frame images from multiple ones of the cameras for the same person so as to generate a group of estimation results for each person; and
a content change circuitry configured to change a content displayed on the signage to another based on the attributes of each person who is expected to be in a position where such person can visually recognize the content on the signage, and also based on preceding behavior of such person before then, the attributes and the preceding behavior being contained in the group of estimation results generated by the estimation result linkage circuitry,
wherein from a motion vector of each person captured in the surveillance-side images, and from a time point at which such person appears in the surveillance-side images, arrival time estimation circuitry estimates an arrival time of such person at which such person is expected to arrive at the position where such person can visually recognize the content on the signage.

2. The signage control system according to claim 1,
wherein the arrival time estimation circuitry is configured to estimate the arrival time of each person captured in the frame images captured by the at least one surveillance camera at which such person is expected to arrive at the position where such person can visually recognize the content on signage, wherein for each person who is expected to arrive at the position where such person can visually recognize the content on the signage as a result of the estimation using the arrival time estimation circuitry, the content change circuitry operates so that, at the time point based on estimated arrival time of such person at which such person is expected to arrive at the position where such person can visually recognize the content on the signage as estimated by the arrival time estimation circuitry, the content change circuitry changes the content displayed on the signage to another based on the attributes and the preceding behavior of such person which are contained in the group of estimation results generated by the estimation result linkage circuitry.

3. The signage control system according to claim 2, wherein based on the person feature stored in the storage device for each person who is expected to arrive at the position where such person can visually recognize the content as a result of the estimation using the arrival time estimation circuitry, the estimation result linkage circuitry links the estimation results based on the frame images from the multiple ones of the cameras for the same person so as to generate the group of estimation results for each person.

4. The signage control system according to claim 2, wherein if the number of persons, at a specific time, who are expected to be in the position where such persons can visually recognize the content on the signage is determined to be plural as a result of the estimation using the arrival time estimation circuitry, the content change circuitry displays, on the signage, a content matching a common attribute for these plural persons in the attributes estimated by the primary estimation circuitry for these plural persons.

5. The signage control system according to claim 4, wherein the content change circuitry displays a predetermined standard content on the signage if the number of persons, at a specific time point, who are expected to be in the position where such persons can visually recognize the content on the signage is determined to be plural as a result of the estimation using the arrival time estimation circuitry, and if a common attribute for these plural persons is absent in the attributes estimated by the primary estimation circuitry for these plural persons.

6. The signage control system according to claim 1, wherein the attributes are gender and age.

7. A non-transitory computer-readable recording medium for recording a signage control program to cause a computer to execute a process including the steps of:

using signage-side images which are frame images from a signage-side camera and surveillance-side images which are frame images from at least one surveillance camera so as to estimate a person feature of each person in these frame images, and also estimate attributes and behavior of the each person captured in these frame images;

associating and storing results of estimations of the person feature, the attributes and the behavior of each specific person using the frame images from each specific one of the signage-side cameras and the at least one surveillance camera;

using the person feature stored in a storage device to link the results of estimations based on the frame images from multiple ones of the cameras for the same person so as to generate a group of estimation results for each person;

changing a content displayed on the signage to another based on the attributes of each person who is expected to be in a position where such person can visually recognize the content on the signage, and also based on preceding behavior of such person before then, the attributes and the preceding behavior being contained in the group of estimation results; and estimating an arrival time of such person at which such person is expected to arrive at the position where such person can visually recognize the content on the signage, from a motion vector of each person captured in the surveillance-side images, and from a time point at which such person appears in the surveillance-side images.

* * * * *